(12) United States Patent
Winiarski

(10) Patent No.: US 8,639,110 B2
(45) Date of Patent: Jan. 28, 2014

(54) PHOTOGRAPHIC STITCHING DEVICE

(71) Applicant: Michael Joseph Winiarski, Bayside, NY (US)

(72) Inventor: Michael Joseph Winiarski, Bayside, NY (US)

( * ) Notice: Subject to any disclaimer, the term of this patent is extended or adjusted under 35 U.S.C. 154(b) by 0 days.

(21) Appl. No.: 13/965,154

(22) Filed: Aug. 12, 2013

(65) Prior Publication Data

US 2013/0330067 A1 Dec. 12, 2013

Related U.S. Application Data

(63) Continuation of application No. 13/430,646, filed on Mar. 26, 2012, now Pat. No. 8,538,253.

(51) Int. Cl.
*G03B 41/00* (2006.01)

(52) U.S. Cl.
USPC .......................................... 396/339

(58) Field of Classification Search
USPC ................... 396/335, 338, 339, 340
See application file for complete search history.

(56) References Cited

U.S. PATENT DOCUMENTS

| | | | | |
|---|---|---|---|---|
| 1,084,687 A * | 1/1914 | Wing | | 396/338 |
| 1,933,889 A * | 11/1933 | Burnell | | 396/339 |
| 2,584,311 A * | 2/1952 | Wells | | 396/339 |
| 2,648,266 A * | 8/1953 | Daly | | 396/340 |
| 3,877,043 A * | 4/1975 | Marvel | | 396/338 |
| 7,711,262 B2 | 5/2010 | Park et al. | | |
| 7,839,429 B2 | 11/2010 | Williams et al. | | |
| 2001/0026684 A1 | 10/2001 | Sorek et al. | | |
| 2010/0182397 A1* | 7/2010 | Choi et al. | | 348/36 |

OTHER PUBLICATIONS

Web pages (2) from www.Calumetphoto.com dated Jun. 30, 2012. Cambo CMSLB-69 Multi-Step Sliding Back. Author Unknown.
Product Brochure. Kapture Group, Inc. 6 pages. Date unknown. Author Unknown.
Product Brochure. Sinar Macroscan Digital Large Format. 4 pages. Date unknown. Sinar AG. Switzerland. Author Unknown.

* cited by examiner

*Primary Examiner* — Clayton E Laballe
*Assistant Examiner* — Noam Reisner
(74) *Attorney, Agent, or Firm* — Patent Technologies, LLC; Robert D. Gunderman, Jr.

(57) ABSTRACT

A photographic stitching device that has a generally planar structure having an offset aperture, a capture device mount proximate to the offset aperture, and a mounting structure to accommodate a camera frame. The photographic stitching device allows a photographer to capture a matrix of precisely overlapping photographs that can later be electronically stitched together to create a higher resolution composite image, a panoramic image, a vista, a stereoscopic image, a 3-D image, an artistic rendering, or similar custom and unique photographic products.

11 Claims, 38 Drawing Sheets

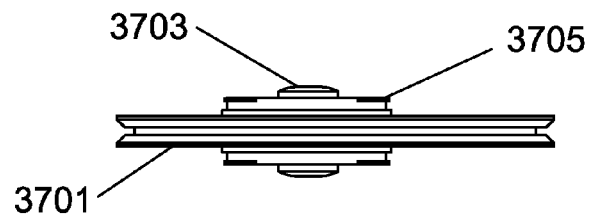
Fig. 39
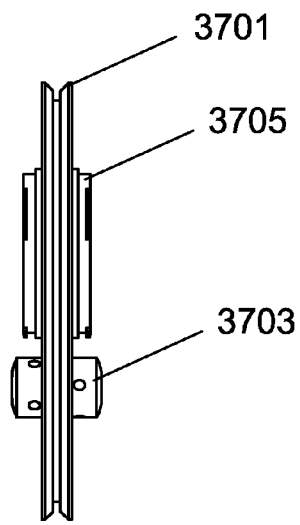 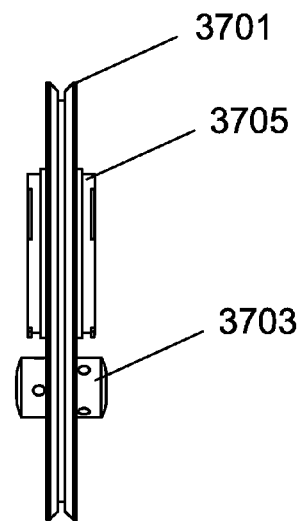
Fig. 40　　　　　　　　　Fig. 41
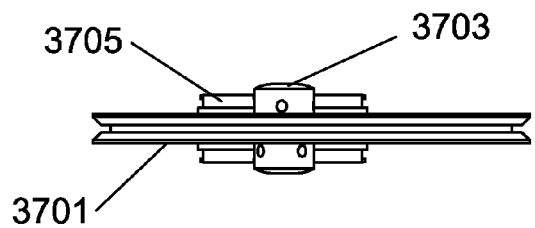
Fig. 42

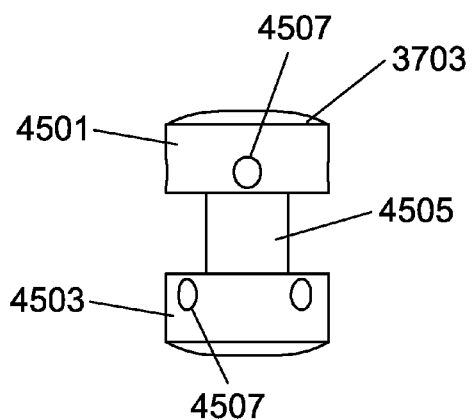
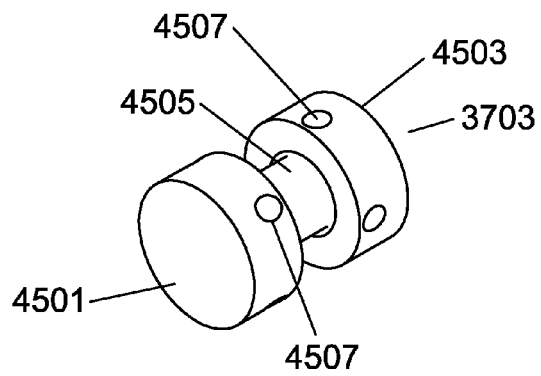
Fig. 45A Fig. 45B
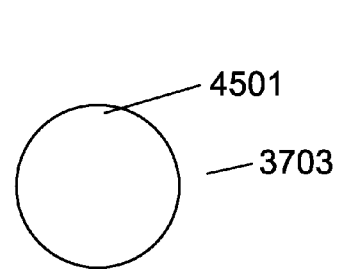
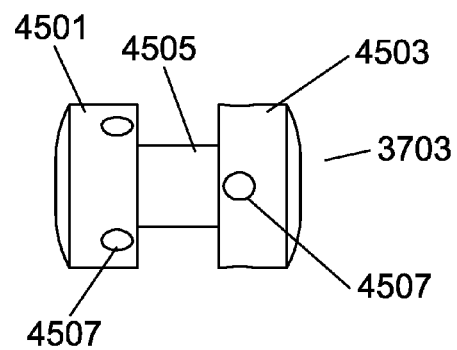
Fig. 45C Fig. 45D

PHOTOGRAPHIC STITCHING DEVICE

CROSS REFERENCE TO RELATED PATENT APPLICATIONS

This application is a continuation of U.S. patent application Ser. No. 13/430,646 filed Mar. 26, 2012 entitled "Photographic Stitching Device" by Michael Joseph Winiarski, which claims priority to U.S. Patent Application Ser. No. 61/468,388 filed Mar. 28, 2011 entitled "Photographic Stitching Device" by Michael Joseph Winiarski, the disclosures of which are incorporated herein by reference in their entirety.

BACKGROUND OF THE INVENTION

1. Field of the Invention

This invention relates generally to photographic equipment, and more particularly to a stitching device that provides a defined series of overlapping images while using a large format camera.

2. Description of the Related Art

Traditional large format photography, such as a 4×5 inch format and larger, has many advantages over small format, such as 35 mm and smaller, and medium format, such as 6×4.5 cm. to 6×9 cm., photography. The ability to compose on a ground glass, control depth of field, and correct perspective has made large format the best choice for professionals in the product and architectural arenas for decades.

As digital photography continues to take over the industry and replace film in nearly all applications, more professional photographers have moved to digital capture as clients demand the cost savings and speed that a digital workflow provides. In using large format cameras and related equipment, photographic equipment manufacturers offer adaptor devices that allow a photographer to use digital technology on existing film cameras. An example of such an adaptor device is a plate for converting a large format film camera to accept a digital device. The plate replaces the ground glass back and film receiver on a large format camera, and allows a photographer to mount a digital capture device containing the circuitry necessary to capture digital images through the optics of an existing large format film camera system. Unfortunately, the smaller format of the capture chips essentially turn a large format camera such as a 4×5 inch camera into a small to medium format device, thus sacrificing many of the advantages of large format photography.

For many years improvements in film technology drove improvements in image quality. As digital printing methods appeared, a combination of film and scanner technologies drove options to new heights. During this time, photographers were able to continue to use the same equipment they always had. As a professional photographer with 25 years in the industry, the Applicant had been using large format equipment continuously throughout his career.

As digital capture quality came of age, image quality improvements were no longer driven by film and scanner technology, but rather by improvements in chip technology. The devices used for high-end digital image capture typically cost from 15,000 to 40,000 dollars and have an effective lifespan of approximately four years. At the end of this obsolescence period, the capture device is still perfectly functional, but the client base has become aware of the availability of increasingly higher resolution image captures and capture devices. The market therefore demands that a photographer upgrade or lose market share. The question "Why are the files so small?" is one that instills dread in a professional photographer, and typically costs upwards of $20,000 to address.

The photographic stitching device of the present invention allows a still photographer to leverage his existing digital capture equipment for several more years while recovering the large format advantages that were heretofore lost in the conversion from film to digital. The photographic stitching device of the present invention, and the various embodiments described and envisioned herein, provides photographers with a way to leverage existing equipment with exquisite results and defer costly and repetitive ongoing device obsolescence.

It is therefore an object of the present invention to provide a photographic stitching device that allows a large format film camera to maintain its inherent advantages and qualities while working with a digital capture device of smaller format.

It is another object of the present invention to provide a photographic stitching device that provides the ability to create spatially proximate photographic images that overlap by a prescribed degree.

These and other objects of the present invention are not to be considered comprehensive or exhaustive, but rather, exemplary of objects that may be ascertained after reading this specification and claims with the accompanying drawings.

BRIEF SUMMARY OF THE INVENTION

In accordance with the present invention, there is provided a photographic stitching device comprising a generally planar structure having an offset aperture, a capture device mount proximate said offset aperture, and a mounting structure to accommodate attachment to a camera frame.

The foregoing paragraph has been provided by way of introduction, and is not intended to limit the scope of the invention as defined by this specification and attached drawings.

BRIEF DESCRIPTION OF THE DRAWINGS

The invention will be described by reference to the following drawings, in which like numerals refer to like elements, and in which:

FIG. 39 is a side view of a first side of the photographic stitching device of FIG. 37;

FIG. 40 is a side view of a second side of the photographic stitching device of FIG. 37;

FIG. 41 is a side view of a third side of the photographic stitching device of FIG. 37;

FIG. 42 is a side view of a fourth side of the photographic stitching device of FIG. 37;

FIG. 45A is a plan view of a feedthrough vent assembly;

FIG. 45B is a perspective view of a feedthrough vent assembly;

FIG. 45C is an end plan view of a feedthrough vent assembly;

FIG. 45D is a rotated plan view of a feedthrough vent assembly;

Figure 1:
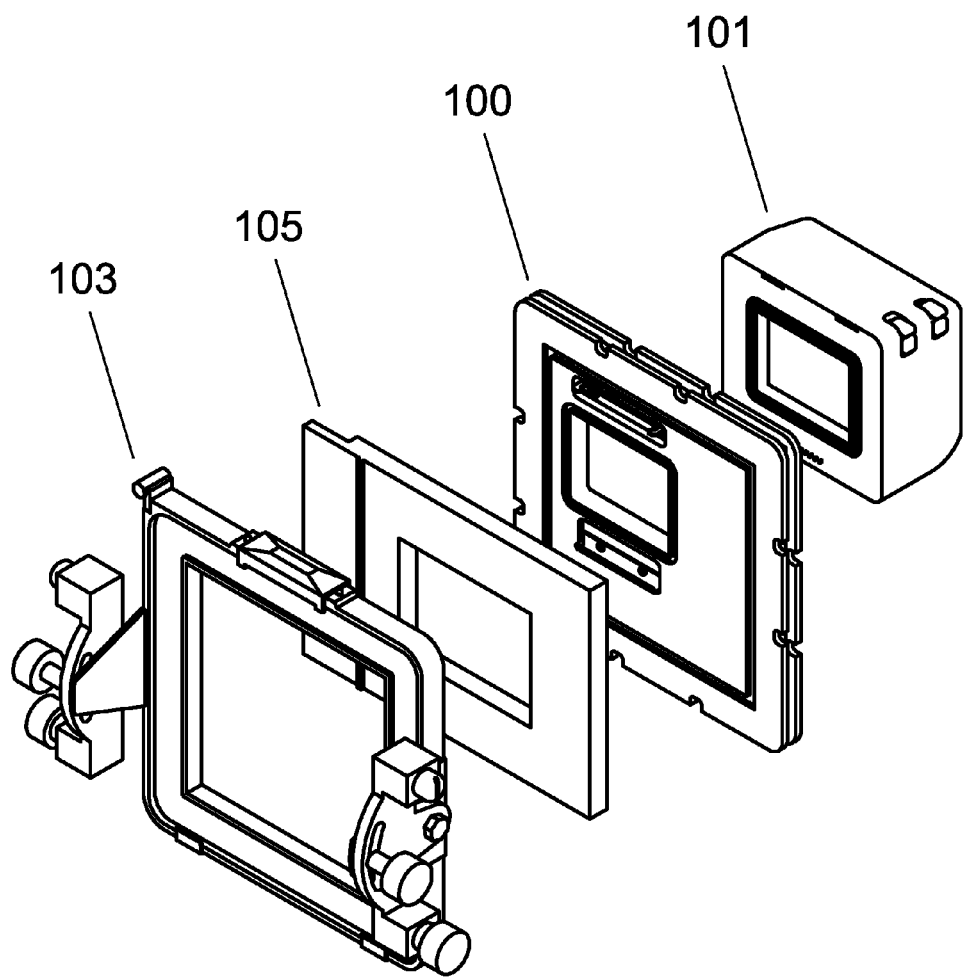
FIG. 1 is an exploded view of the photographic stitching device and spacer/image mask.

The present invention will be described in connection with a preferred embodiment, however, it will be understood that there is no intent to limit the invention to the embodiment described. On the contrary, the intent is to cover all alternatives, modifications, and equivalents as may be included within the spirit and scope of the invention as defined by this specification, claims and drawings.

DESCRIPTION OF THE PREFERRED EMBODIMENTS

For a general understanding of the present invention and the various embodiments described or envisioned herein, reference is made to the drawings. In the drawings, like reference numerals have been used throughout to designate identical elements. The present invention, as described and depicted herein, comprises novel details of construction and novel combinations and arrangements of parts, and will become clear after reading this specification with the accompanying drawings. The drawings depict various embodiments of the present invention that are provided by way of example, and not limitation. Other embodiments may be envisioned after reading this specification and viewing the attached drawings, these embodiments being within the spirit and broad scope of the present invention.

In the drawings, FIGS. 1-8 depict a four way stitching device, designed to allow adjacent, overlapping captures of two or four images in both vertical and horizontal orientations FIGS. 9-36 depict a nine way stitching device, designed to allow adjacent, overlapping captures of two, three, four, six or nine images in both vertical and horizontal orientations. FIGS. 37-44 depict a four way stitching device for Digital Single Lens Reflex cameras. FIGS. 45-54 depict novel venting arrangements for a stitching device of the present invention, FIGS. 55-62 depict a twelve way stitching device for Digital Single Lens Reflex cameras. FIGS. 63-75 depict an alternate embodiment of the nine way stitching device previously depicted in FIGS. 9-36, and FIGS. 76-78 depict a mask for use with a stitching device of the present invention. From the disclosure and drawings, one can envision other stitching devices and will be guided by the disclosure contained herein to understand how to make and use these stitching devices. Further applications may also be envisioned that utilize the present invention and variations thereof. For example, three dimensional or stereoscopic applications, among others. Therefore, other embodiments that may be envisioned after reading this specification and claims, and viewing the attached drawings are to be construed as within the spirit and broad scope of the present invention and its various embodiments.

The four way stitching device of the present invention may be made from a metal such as aluminum, steel, titanium, stainless steel, copper, brass, or the like. The various features of the four way stitching device that are depicted in FIGS. 1-8 and may be modified or added to may be embodied in a metal or even a composite structure by way of machining, casting, or the like. The four way stitching device may also be made from a plastic such as polypropylene, acrylic, acrylonitrile butadiene styrene (ABS), polyethylene, polystyrene, polyvinyl chloride, polytetrafluoroethylene, or the like, and may be injection molded, cast, machined, or otherwise formed into the device depicted in FIGS. 1-8 or modifications thereof. Turning now to FIG. 1, an exploded view of the photographic stitching device in use is depicted. For clarity, only a portion of the camera is shown. The four-way stitching device 100 can be clearly seen along with a capture device 101, a focusing spacer/image mask, and a large format camera frame 103. The four way stitching device 100 serves to create a sequence of up to four images that are spatially proximate and overlapping to one another that can be stitched together using photographic editing software to create a larger higher resolution composite image. The capture device 101 contains the digital imaging array necessary to capture an image digitally and convert the image to a digital file. Capture devices are known, and are oftentimes used with a large format camera to render a digital image from an existing large format camera that may have previously been a film based device. The large format camera frame 103 allows for coupling of accessories to a large format camera. A focusing spacer/image mask 105 is used to move the plane of focus of the large format camera's ground glass focusing screen to match the focus plane of a digital capture unit mounted on the four way stitching device and also serves as a mask defining the available area to be exposed. The size of the mask opening, thickness of the focusing spacer/image mask 105 and other geometries and fastening features may vary based on the camera and capture device to be used. In use, a photographer places the mask under the ground glass and composes and focuses his image as he normally would. He then removes the ground glass assembly and replaces it with the four, nine, or twelve way stitching device and makes his exposures.

Figure 2:
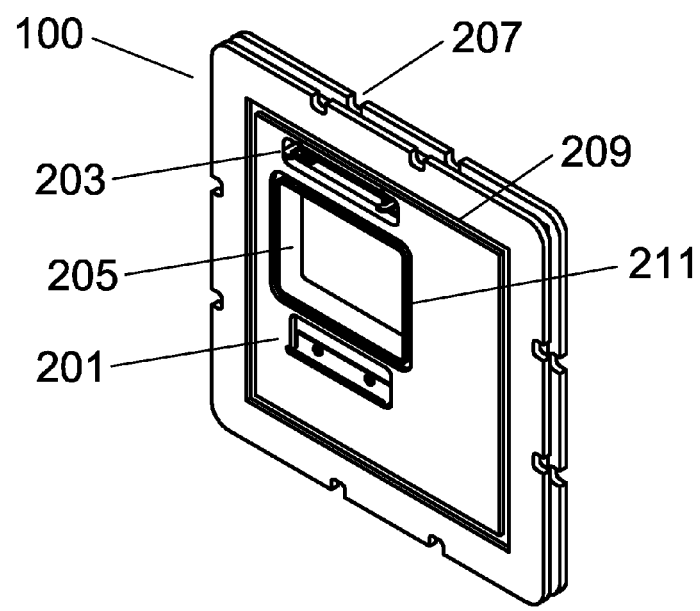
FIG. 2 is a perspective view of the photographic stitching device.

FIG. 2 is a perspective view of the photographic stitching device and depicts some of the physical attributes of the device. A first mounting structure 201 and a second mounting structure 203 can be seen and provide a mechanical means of attaching a capture device such as that depicted in FIG. 1. Other capture device mounts may be employed to accommodate the particular requirements of various capture device manufacturers. In some embodiments of the present invention, a single mounting structure or a plurality of mounting structures may be employed. The specific structure and quantity of the mounting structures used to attach a capture device to the four-way stitching device will vary to accommodate various manufacturers of capture devices. An aperture 205 is depicted that provides an exposure opening. The aperture is offset to allow for the creation of four spatially proximate exposures that overlap by a prescribed degree. Further, the aperture is lined with an anti-reflective material, coating, or the like. The stitching device plate itself, which is the fundamental component of the four way stitching device 100, can be considered divided into four quadrants. The aperture 205 is located in one of the four quadrants of the stitching device plate to create an offset, as depicted in FIG. 2. Notches 207 or other structures may be used for camera mounting purposes. The notches 207 may be, in some embodiments of the present invention, on the outer perimeter of the stitching device. These structures will vary to accommodate the configurations of camera mounting frames 103 produced by various manufacturers of large format cameras. A camera mount light trap groove 209 can also be seen which may be a groove, channel, or step to prevent light from infiltrating the camera to which the four-way stitching device is attached. The light trap may be just an absence of material, or it may contain a gasket, seal or some other optical barrier. A similar physical structure is the capture device light trap groove 211 that serves to prevent light from infiltrating the capture device attached to the four-way stitching device. The capture device light trap groove 211 again may be a groove, channel, or step to prevent light infiltration. The light trap may be just an absence of material, or it may contain a gasket, seal or some other optical barrier.

Figure 3:
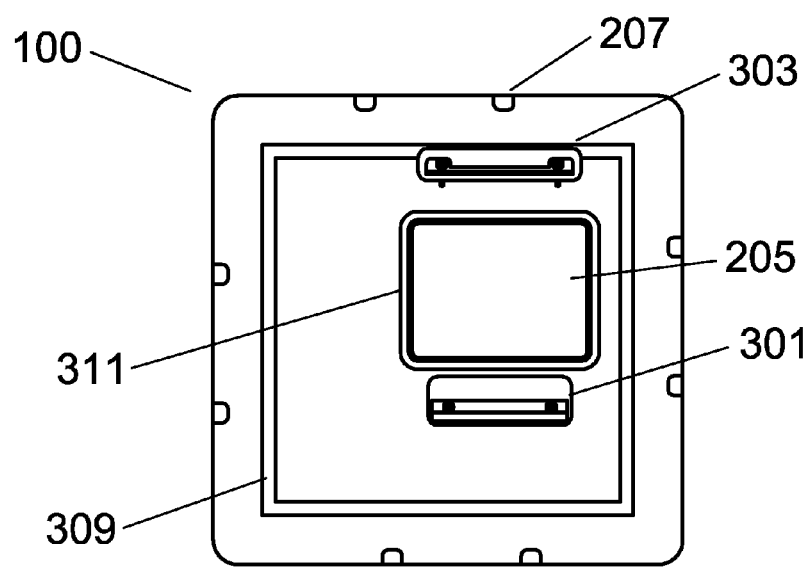
FIG. 3 is a plan view of the obverse side of the photographic stitching device.

FIG. 3 is a plan view of the obverse side of the photographic stitching device. A first mounting structure 301 and a second mounting structure 303 can be seen, and are used to attach a capture device to the four way stitching device. The specific structure and quantity of the mounting structures used to attach a capture device to the four-way stitching device will vary based on the manufacturer of the capture device. The four way stitching device is intended for two-sided use where a capture device may be mounted alternately on either side of the four way stitching device. It is in fact the ability to mount a capture device on either side of the four-way stitching device combined with the offset of the aperture that provides the ability to create up to four spatially proximate and overlapping exposures. On each side of the 4-way stitching device 100, a light trap 311 can be seen surrounding the aperture 205 and serves to optically seal a capture device to the aperture 205. The light trap 311 may be a groove, channel, or step to prevent light infiltration. The light trap 311 may be just an absence of material, or it may contain a gasket, seal or some other optical barrier. The light trap 311 is on both the first side and the second side of the 4-way stitching device 100.

Figure 4:
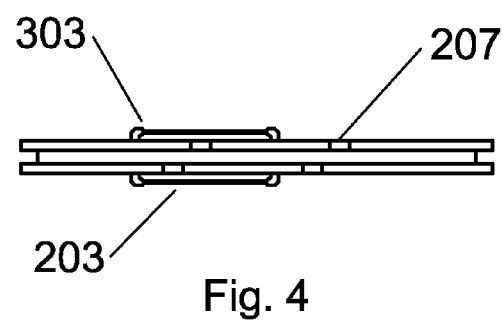
FIG. 4 is a side view of a first side of the photographic stitching device.
Figure 5:
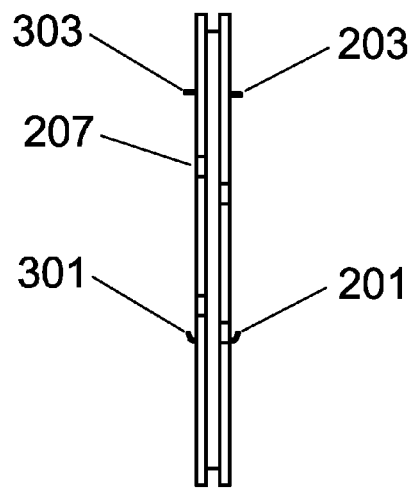
FIG. 5 is a side view of a second side of the photographic stitching device.
Figure 6:
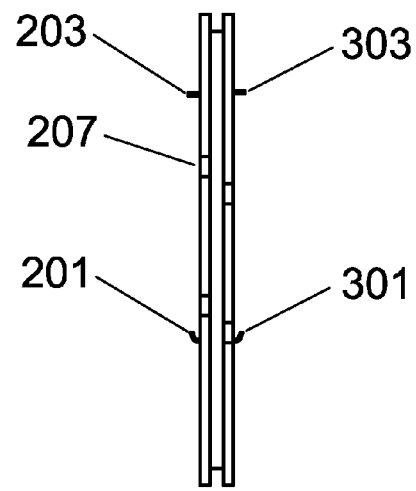
FIG. 6 is a side view of a third side of the photographic stitching device.
Figure 7:
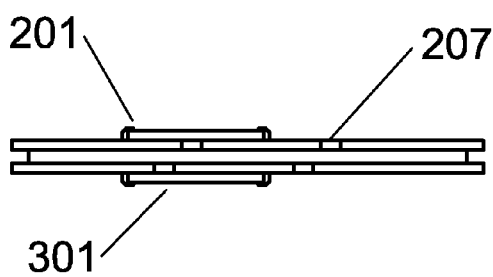
FIG. 7 is a is a side view of a fourth side of the photographic stitching device.
Figure 8:
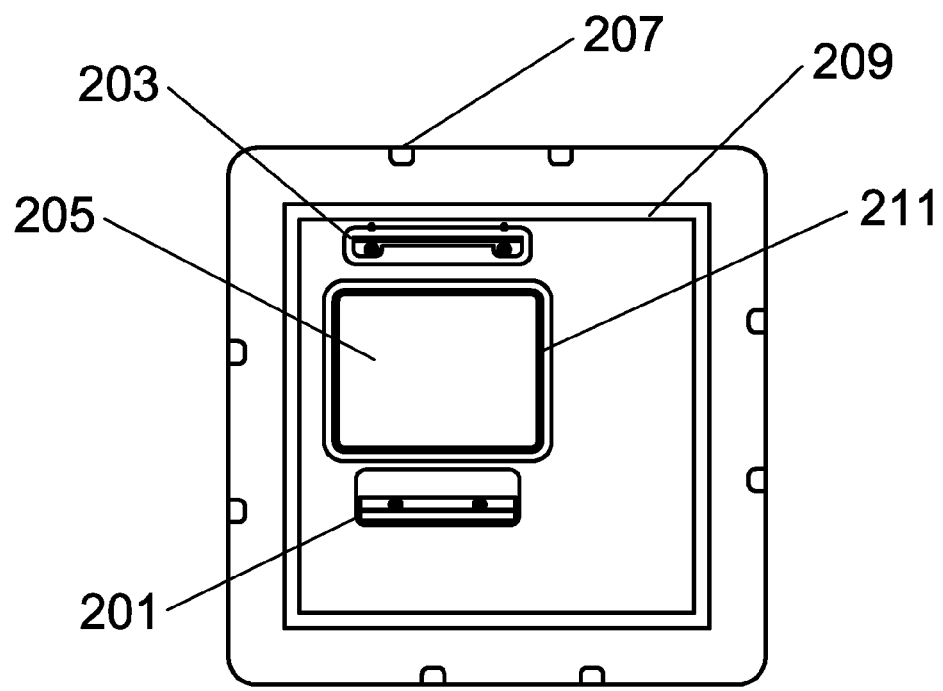
FIG. 8 is a plan view of the photographic stitching device.

To use the four way stitching device, the four way stitching device is mounted between a camera and a capture device as depicted and described by way of FIG. 1. Once a first exposure is taken, the four way stitching device is removed with the capture device attached, rotated 180 degrees and replaced. A second exposure is taken. The four-way stitching device is then removed, the capture device is now moved to the obverse side of the four way stitching device, remounted on the camera, and a third exposure taken. Lastly, the four-way stitching device is removed again, rotated 180 degrees and remounted. A final fourth exposure is taken, and the shooting process is complete. Now a photographer has four spatially proximate and overlapping images that can be stitched together by way of photo editing software, for example, creating a single higher resolution composite image. The four way stitching device may be used to create images in either a vertical or horizontal orientation by rotating the device ninety degrees, and composite images of up to four captures may be produced through a modified shooting sequence. To provide a complete understanding and description of the four way stitching device, FIG. 4 is a side view of a first side of the photographic stitching device, FIG. 5 is a side view of a second side of the photographic stitching device, FIG. 6 is a side view of a third side of the photographic stitching device, and FIG. 7 is a side view of a fourth side of the photographic stitching device. Depicting the same position of the four-way stitching device shown in FIG. 1, FIG. 8 is a plan view of the photographic stitching device.

Figure 9:
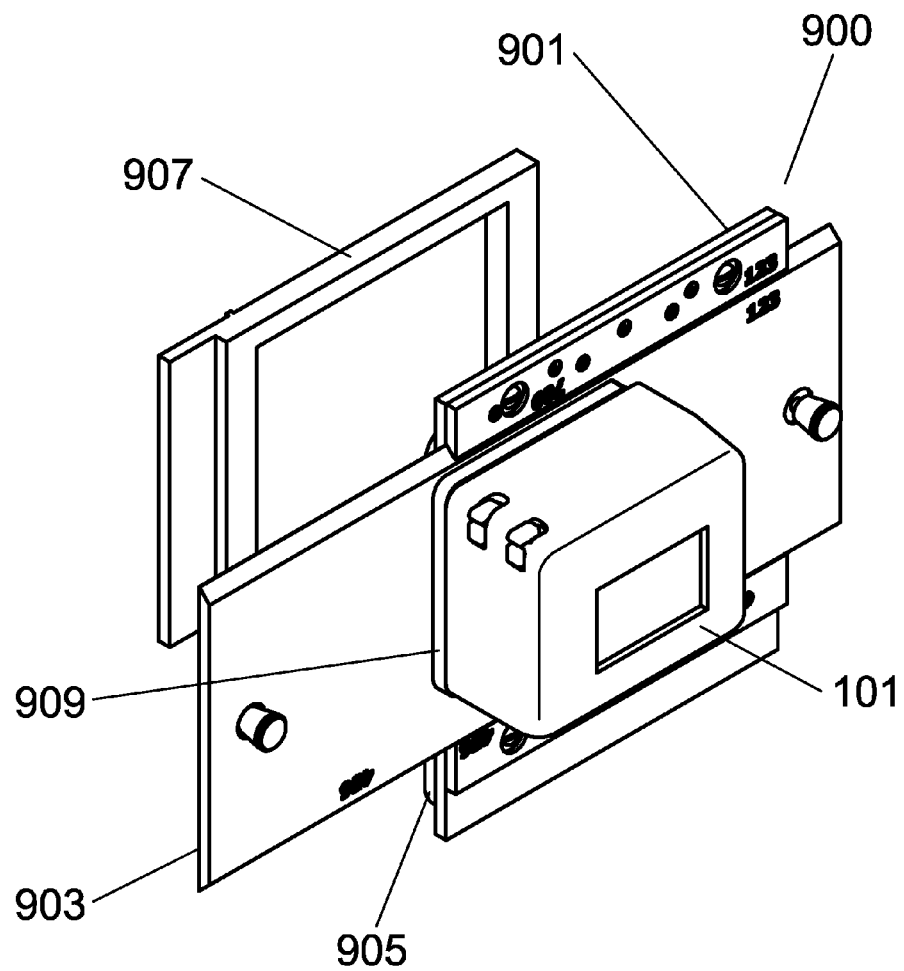
FIG. 9 is a perspective view of a second embodiment of the photographic stitching device with a capture device mounted.

Building on the inventive disclosure of the four-way stitching device heretofore described, a nine-way stitching device is portrayed in FIGS. 9-36. The nine-way stitching device of the present invention may be made from a metal such as aluminum, steel, titanium, stainless steel, copper, brass, or the like. The nine-way stitching device may also be made from a plastic such as polypropylene, acrylic, acrylonitrile butadiene styrene (ABS), polyethylene, polystyrene, polyvinyl chloride, polytetrafluoroethylene, or the like, and may be injection molded, cast, machined, or otherwise formed into the device depicted in FIGS. 9-36 or modifications thereof. The various features of the nine-way stitching device that are depicted in FIGS. 9-36 may be modified or added to, in order to support a variety of camera types, capture devices, and applications. Turning now to FIG. 9, a perspective view of the nine-way photographic stitching device is depicted with a digital capture device attached. The nine-way stitching device 900 can be mounted to a large format camera the same way in which the four-way stitching device is attached, where the stitching device is mounted between a capture device 101 and a large format camera frame 103. Similar to the four-way stitching device, a focusing spacer/image mask 907 can be seen. A focusing spacer/image mask 907 is used to both move the plane of focus of the large format camera's ground glass focusing screen to match the focus plane of a digital capture unit mounted on the nine-way stitching device and also serves as a mask defining the available area to be exposed. The size of the mask opening, thickness of the focusing spacer/image mask 907 and other geometries and fastening features may vary based on the camera and capture device to be used. In use, a photographer places the mask under the ground glass and composes and focuses his image as he normally would. He then removes the ground glass/spacer-mask assembly and replaces it with the four or nine-way stitching device and makes his exposures. The nine and twelve way stitching devices operate using offset apertures, camera mounts, slide mechanisms and moveable components to create a sequence of up to twelve images that are spatially proximate to one another and overlap by a prescribed degree that can be stitched together using photographic editing software to create a larger higher resolution composite image. The slide 903 can be seen riding within a slide receiver frame 901. The slide 903 has a generally planar structure and is slidingly engaged in the slide receiver frame 901. The slide and slide receiver frame have mating surfaces to allow for movement of the slide 903 within the frame 901 while still retaining the slide 903 within the frame 901. In some embodiments of the present invention, the slide 903 and the slide receiver frame 901 have complimentary mating surfaces that serve to retain the slide 903 within the slide receiver frame 901. Such complimentary mating surfaces may be angled, notched, tracked, or the like. FIG. 9 shows an example of such complimentary mating surfaces where the surfaces are angled with respect to each other, and the angle is configured in such a way that the slide 903 is retained within the slide receiver frame 901. As will become further evident after reading this specification and viewing subsequent drawings, the slide receiver frame has an offset and the slide aperture (as later seen in FIGS. 10 and 11) also has an offset. These offsets serve to compliment each other in operation, and serve to provide, in conjunction with rotation of mounts and the slide, a matrix of precisely overlapping photographs that can later be stitched together using photo editing software to create a higher resolution composite image, a panoramic image, a vista, a streoscopic image, a 3-D image, an artistic rendering, or similar custom and unique photographic products.

Attached to the slide 903 is a capture device mounting point such as the capture device mounting plate 909 and a capture device 101. The capture device 101 contains the digital imaging array necessary to capture an image digitally and convert the image to a digital file. Capture devices are known, and are oftentimes used with a large format camera to render a digital image using an existing large format camera that may have previously been a film based device. A camera mounting frame 905 can also be seen that allows the nine-way stitching device to be attached to a camera. There are numerous other features depicted in FIG. 9 that will be further explained by way of subsequent figures.

Figure 10:
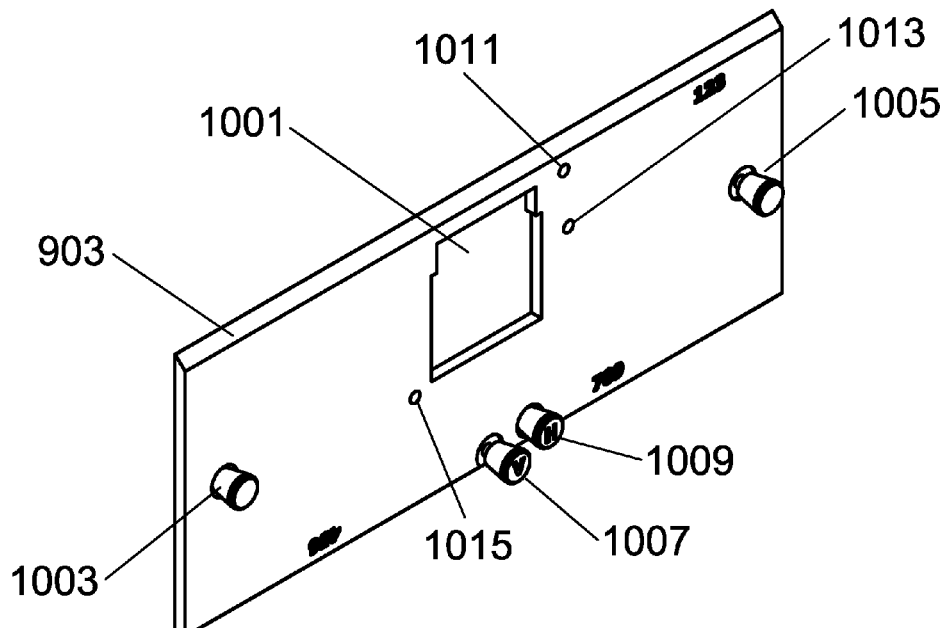
FIG. 10 is a perspective view of the slide of the photographic stitching device of FIG. 9.

FIG. 10 is a perspective view of the slide of the photographic stitching device of FIG. 9. A capture device mounting plate is not shown, but is later depicted in FIG. 17. An aperture 1001 can be seen that provides for an exposure opening that is necessary in operation. The slide 903 also contains a first stop 1003 and a second stop 1005 that in use prevents the slide and attached capture device from inadvertently being removed from the slide receiver frame. The first stop 1003 and the second stop 1005 may be, for example, spring loaded pull out knobs that can be set in either an extended or retracted position based on how the nine-way stitching device is being used. A vertical registration pin 1007 and a horizontal registration pin 1009 can also be seen in FIG. 10, and may be, for example, spring loaded pull out knobs that can be set in either an extended or retracted position to engage with a series of registration holes depending on how the nine-way stitching device is being used (vertical or horizontal mode). To accommodate a capture device mounting plate, a first mounting point 1011, a second mounting point 1013, and a third mounting point 1015 can be seen. Other mounting techniques and fasteners may also be used in addition to different placements and geometries dependent on the capture device configuration in use.

Figure 11:
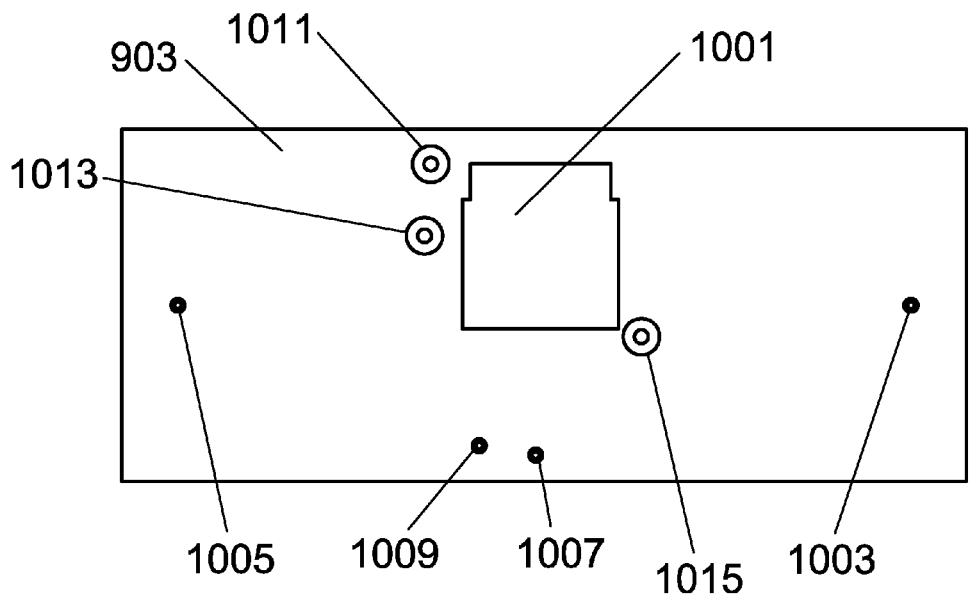
FIG. 11 is a plan view of the back side of the slide of FIG. 10.
Figure 12:
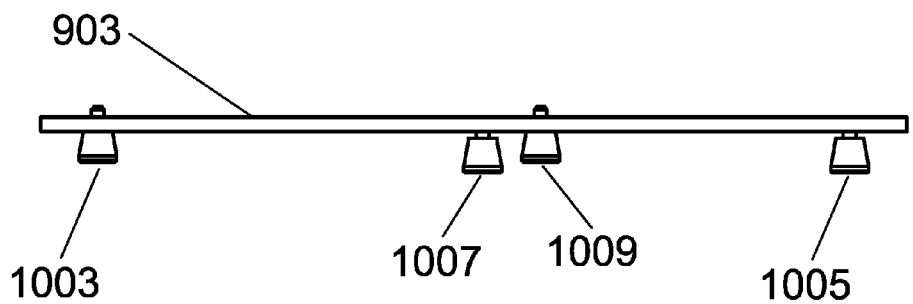
FIG. 12 is a side view of a first side of the slide of FIG. 10.
Figure 13:
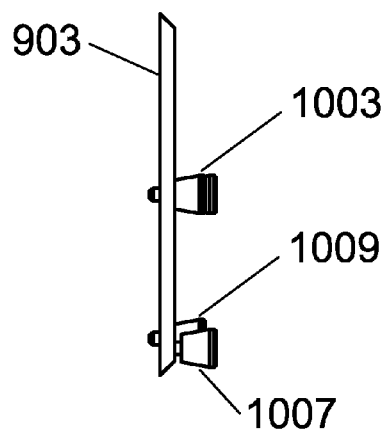
FIG. 13 is a side view of a second side of the slide of FIG. 10.
Figure 14:
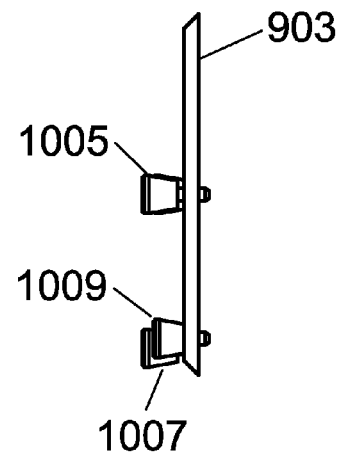
FIG. 14 is a side view of a fourth side of the slide of FIG. 10.
Figure 15:
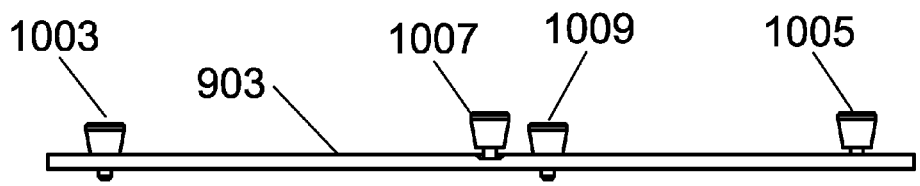
FIG. 15 is a side view of a third side of the slide of FIG. 10.

FIG. 11 is a plan view of the back side of the slide 903 that shows the mounting holes for the capture device mounting plate, the pin portion of the first stop 1003 and the second stop 1005, and the aperture 1001. FIGS. 12-15 show each side of the slide of FIG. 10, where FIG. 12 is a side view of a first side of the slide of FIG. 10. FIG. 13 is a side view of a second side of the slide of FIG. 10, FIG. 14 is a side view of a fourth side of the slide of FIG. 10, and FIG. 15 is a side view of a third side of the slide of FIG. 10. The first side of the slide of FIG. 10 being the 12 o'clock position; the second side of the slide of FIG. 10 being the 9 o'clock position; the third side of the slide of FIG. 10 being the 6 o'clock position; and the fourth side of the slide of FIG. 10 being the 3 o'clock position.

Figure 16:
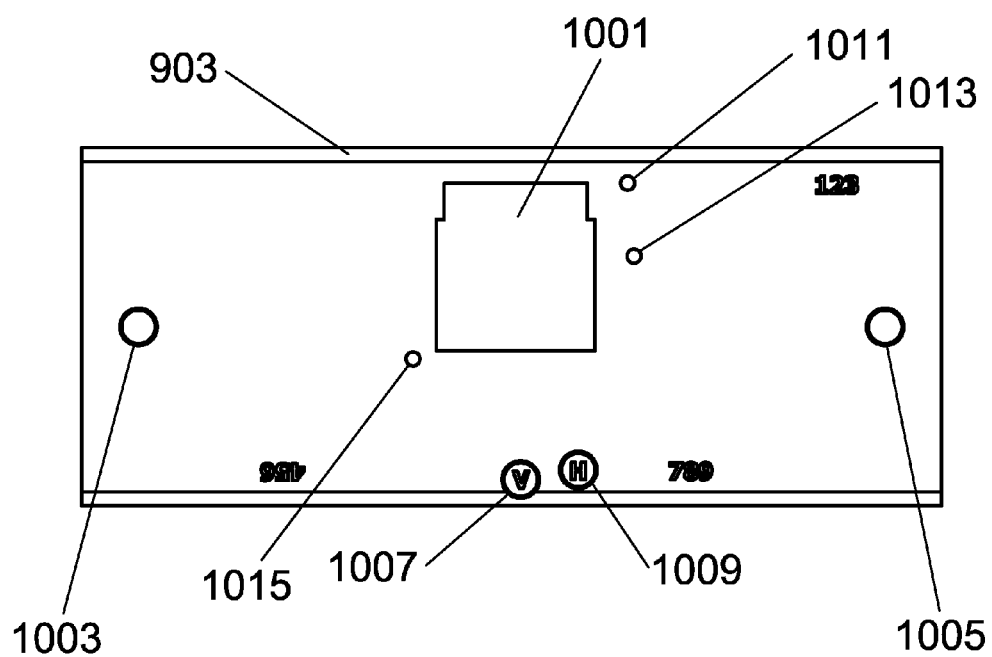
FIG. 16 is a plan view of the slide of FIG. 10.
Figure 17:
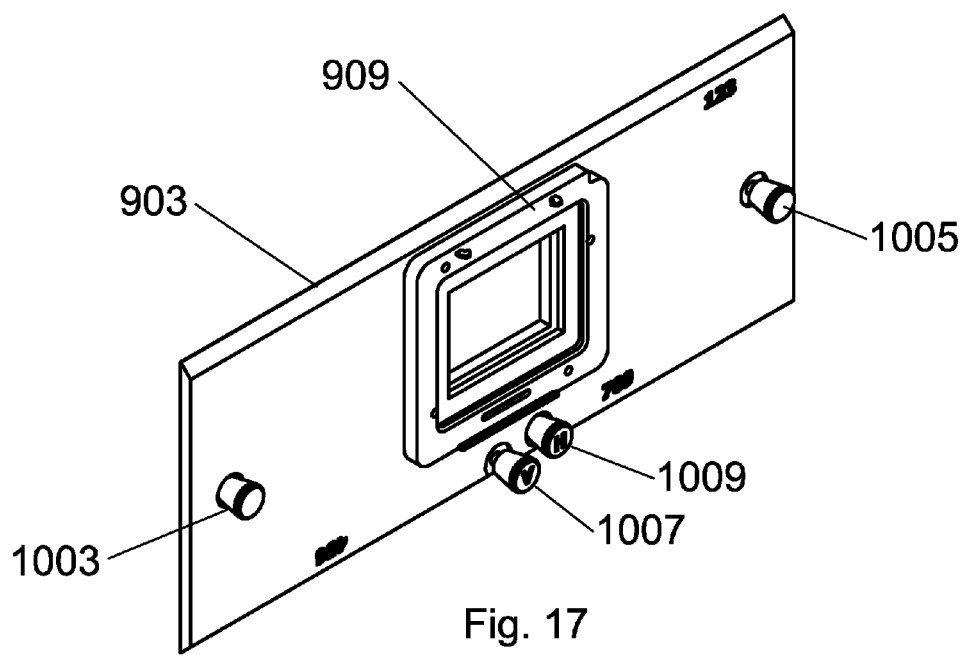
FIG. 17 is a perspective view of the slide of FIG. 10 with a capture device mounting plate mounted in a horizontal position.
Figure 18:
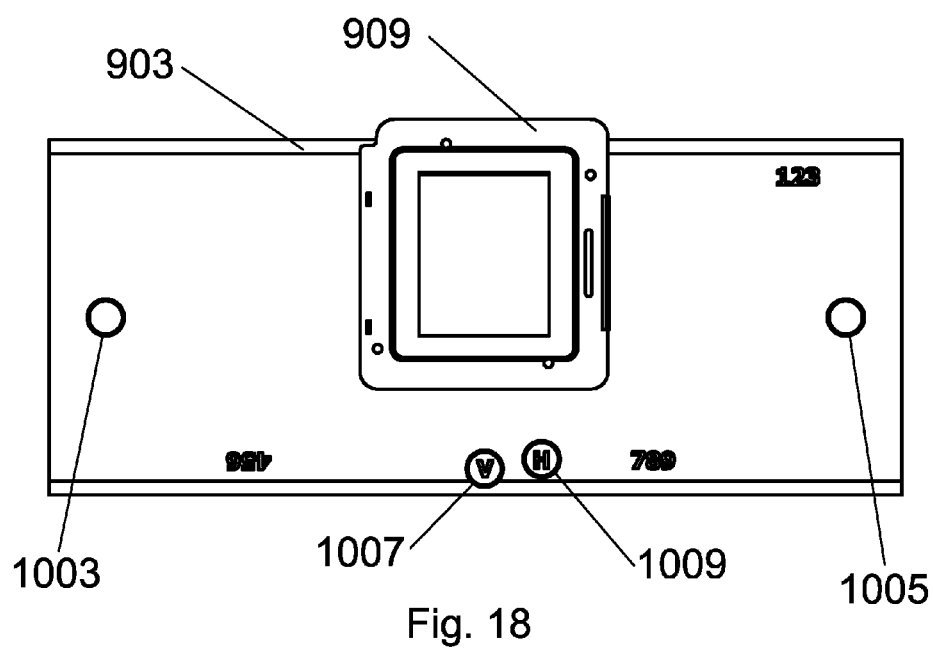
FIG. 18 is a plan view of the slide of FIG. 10 with a capture device mounting plate mounted in a vertical position.
Figure 19:
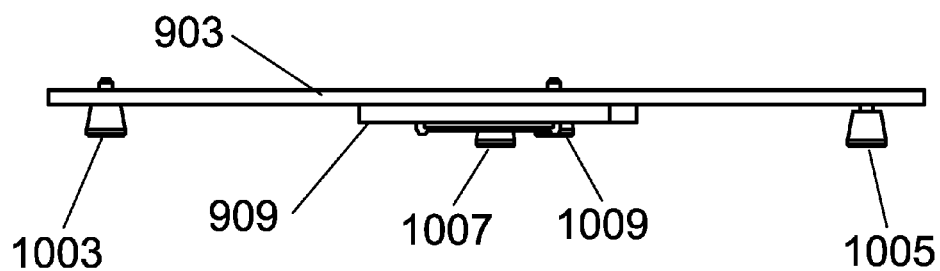
FIG. 19 is a side view of a first side of the slide of FIG. 18.
Figures 20, 21:
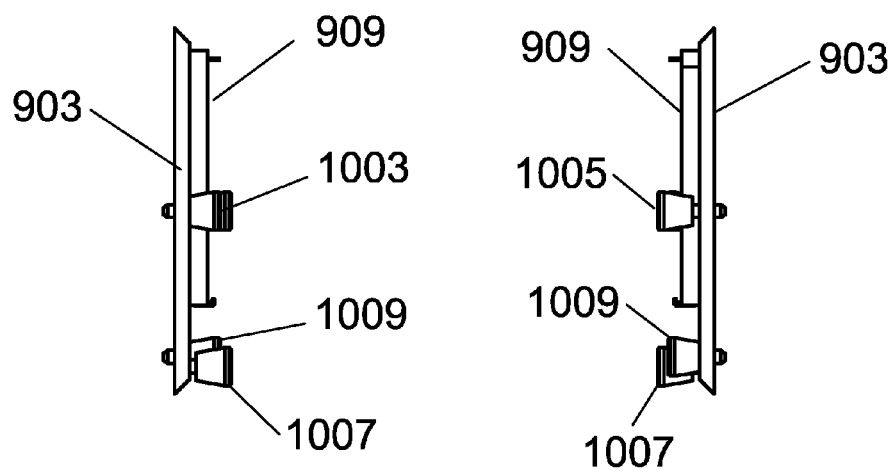
FIG. 20 is a side view of a second side of the slide of FIG. 18.
FIG. 21 is a side view of a fourth side of the slide of FIG. 18.
Figure 22:
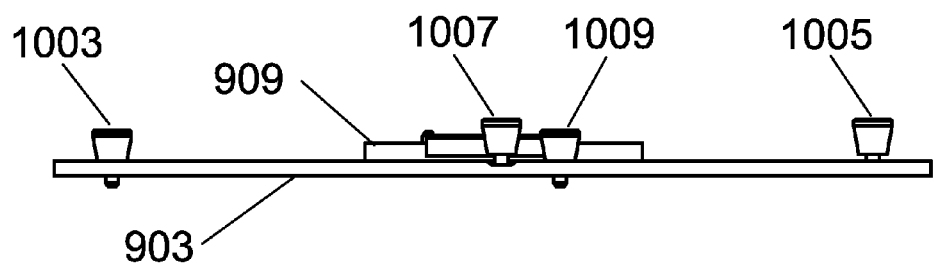
FIG. 22 is a side view of a third side of the slide of FIG. 18.

FIG. 16 is a plan view of the slide of FIG. 10. FIG. 17 is a perspective view of the slide of FIG. 10 with a capture device mounting plate mounted in a horizontal position. A capture device mounting plate 909 is shown attached to the slide 903 using fasteners through the mounting points 1011, 1013 and 1015 previously depicted in FIGS. 10 and 11. The capture device mounting plate 909 provides attachment features for a capture device to be retained to the slide 903. The capture device mounting plate 909 may be made of a metal, a plastic, or the like and may be attached with fasteners or by another method. FIG. 18 is a plan view of the slide of FIG. 10 with a capture device mounting plate mounted in a vertical position. The capture device mounting plate may be mounted in either orientation through the use of fasteners through mounting points 1011, 1013 and 1015, or other comparable hardware and provides the ability to produce composite photographs with either a horizontal or a vertical orientation. FIGS. 19-22 show each side of the slide of FIG. 18, where FIG. 19 is a side view of a first side of the slide of FIG. 18, FIG. 20 is a side view of a second side of the slide of FIG. 18. FIG. 21 is a side view of a fourth side of the slide of FIG. 18, and FIG. 22 is a side view of a third side of the slide of FIG. 18. The first side of the slide of FIG. 18 being the 12 o'clock position; the second side of the slide of FIG. 18 being the 9 o'clock position; the third side of the slide of FIG. 18 being the 6 o'clock position; and the fourth side of the slide of FIG. 18 being the 3 o'clock position.

Figure 23:
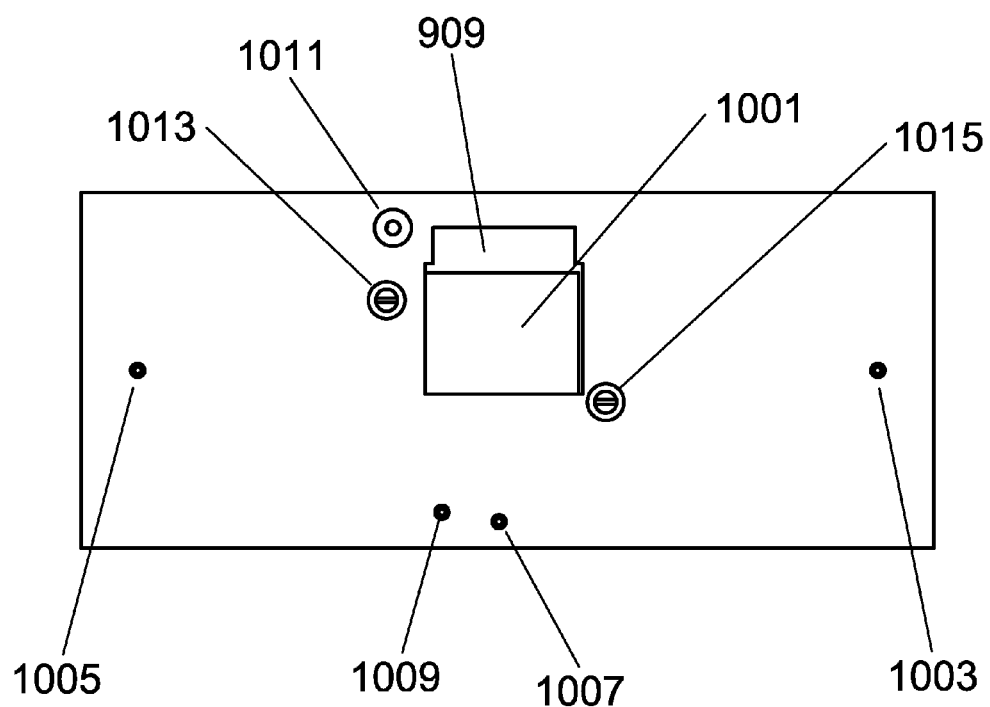
FIG. 23 is a plan view of the back side of the slide of FIG. 18 with a capture device to attached in a horizontal position.

FIG. 23 is a plan view of the back side of the slide of FIG. 18 that shows the mounting fasteners for the capture device mounting plate, the pin portion of the first stop 1003 and the second stop 1005, the pin portion of the vertical and horizontal registration pins, and the aperture 1001.

Figure 24:
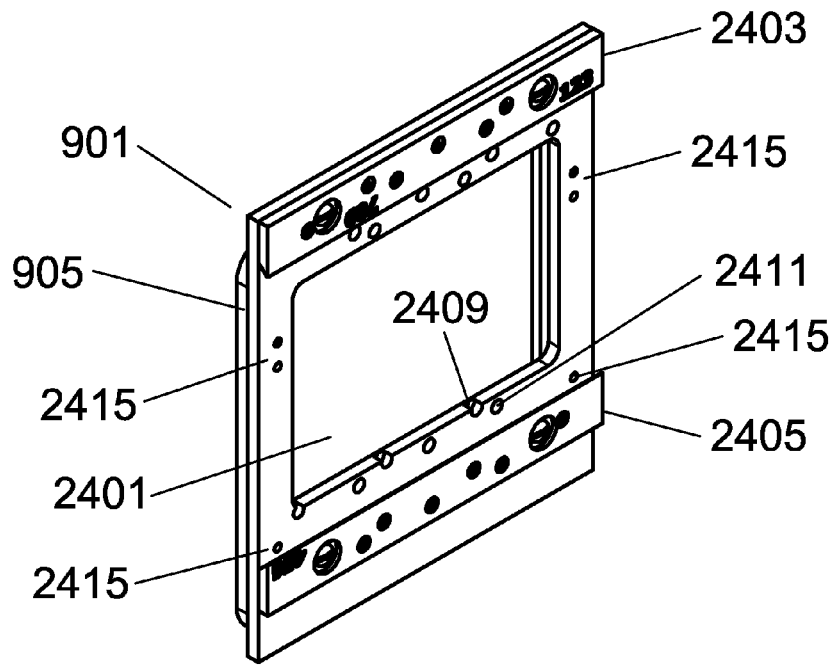
FIG. 24 is a perspective view of a slide receiver frame and camera mounting frame.
Figure 25:
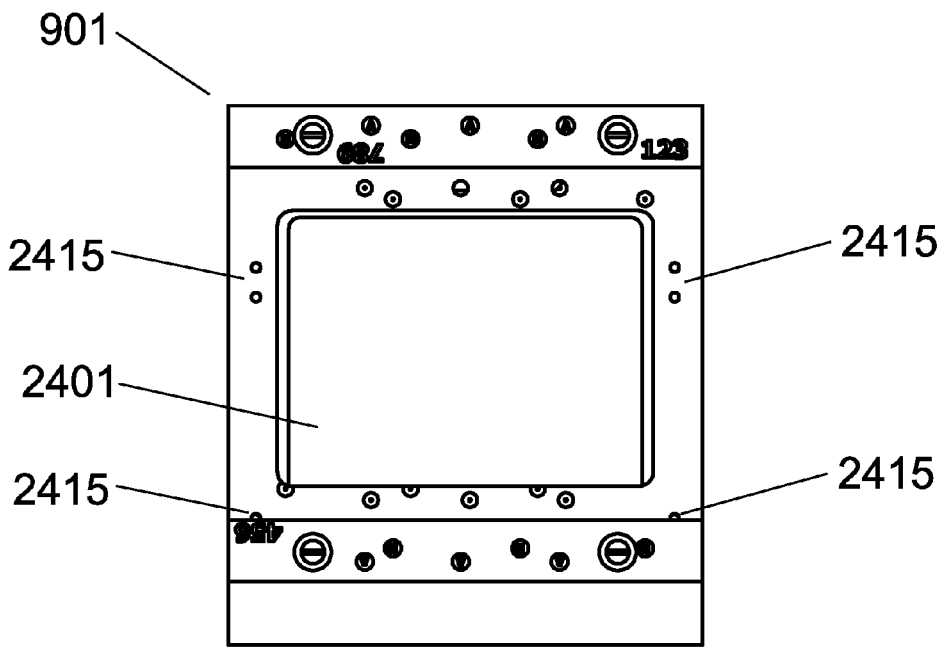
FIG. 25 is a plan view of a slide receiver frame and camera mounting frame.

FIG. 24 is a perspective view of a slide receiver frame and camera mounting frame. The slide receiver frame has a first slide receiver 2403 and a second slide receiver 2405. The slide and slide receiver frame have mating surfaces to allow for movement of the slide 903 (not shown in FIG. 24) within the frame 901 while still retaining the slide 903 within the frame 901. A camera mounting frame 905 can also be seen that allows the nine-way stitching device to be mounted on a camera. Also depicted in FIG. 24 are a series of horizontal pin registration holes 2409 and a series of vertical pin registration holes 2411. The registration holes are to retain the vertical registration pin or the horizontal registration pin while using the nine-way stitching device in either horizontal mode or vertical mode. Also depicted are the Vertical and Horizontal setback mounting points 2415. These mounting points allow the user to change the position of the slide receiver frame in relation to the camera mounting frame to switch between vertical and horizontal capture orientations. An opening 2401 can also be seen in the slide receiver frame 901. FIG. 25 is a plan view of a slide receiver frame and camera mounting frame.

Figure 26:
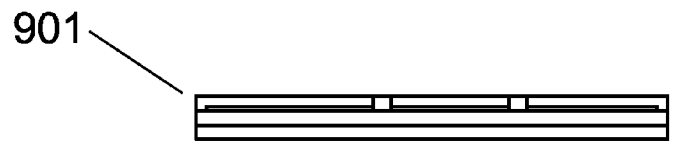
FIG. 26 is a side view of a first side of the slide receiver frame and camera mounting frame of FIG. 25.
Figures 27, 28:
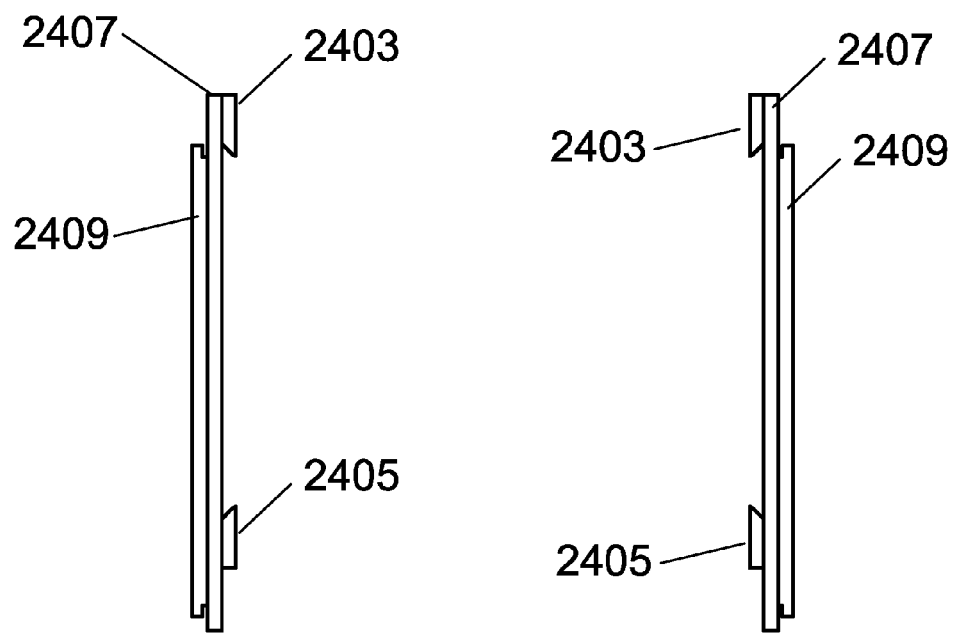
FIG. 27 is a side view of a second side of the slide receiver frame and camera mounting frame of FIG. 25.
FIG. 28 is a side view of a fourth side of the slide receiver frame and camera mounting frame of FIG. 25.
Figure 29:
FIG. 29 is a side view of a third side of the slide receiver frame and camera mounting frame of FIG. 25.

FIGS. 26-29 show each side of the slide receiver frame of FIG. 25, where FIG. 26 is a side view of a first side of the slide receiver frame of FIG. 25, FIG. 27 is a side view of a second side of the slide receiver frame of FIG. 25, FIG. 28 is a side view of a fourth side of the slide receiver frame of FIG. 25, and FIG. 29 is a side view of a third side of the slide receiver frame of FIG. 25. The first side of the slide receiver frame of FIG. 25 being the 12 o'clock position; the second side of the slide receiver frame of FIG. 25 being the 9 o'clock position; the third side of the slide receiver frame of FIG. 25 being the 6 o'clock position; and the fourth side of the slide receiver frame of FIG. 25 being the 3 o'clock position.

Figure 30:
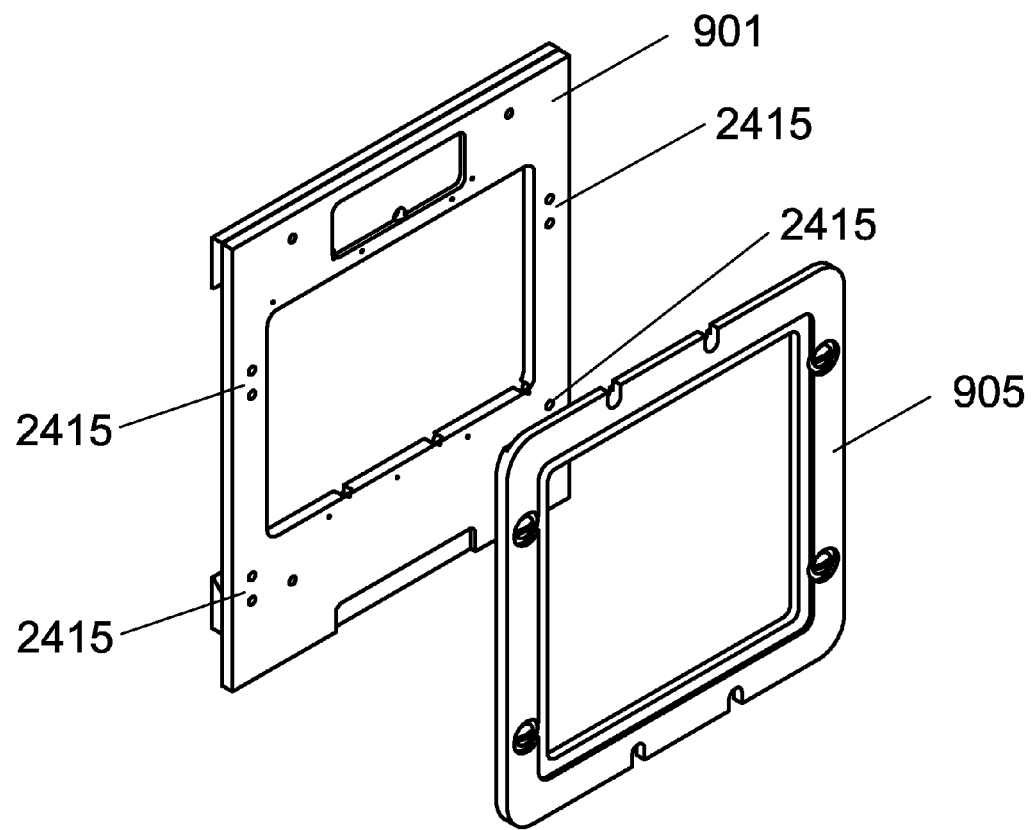
FIG. 30 is an exploded perspective view of the slide receiver frame and camera mounting frame.

For a complete understanding of the connection of the slide receiver frame and the camera mounting frame. FIG. 30 is an exploded perspective view of the slide receiver frame 901 and camera mounting frame 905. By choosing the upper or lower setback mounting points 2415 the frames are configured in relation to each other for vertical or horizontal capture orientation.

Figure 31:
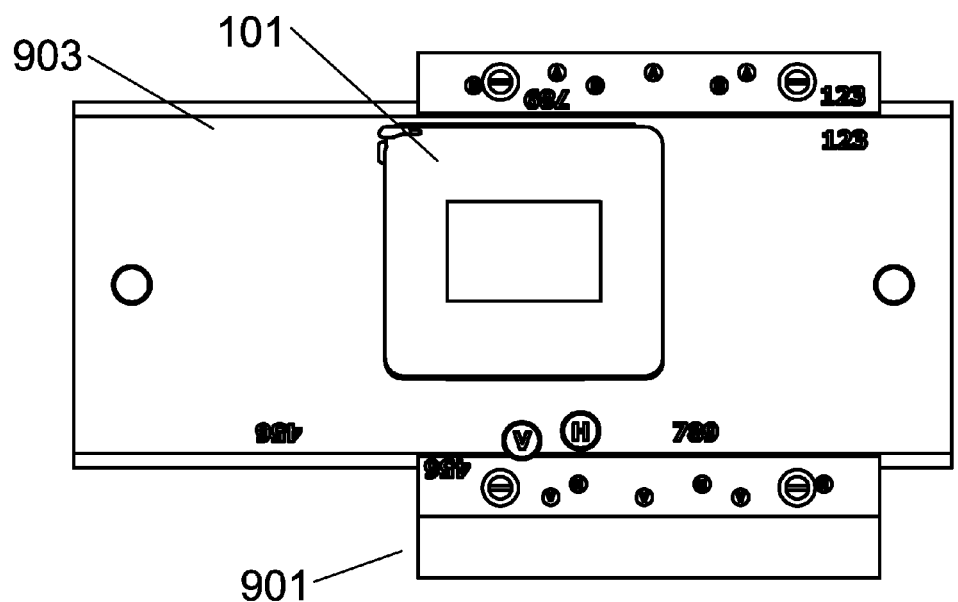
FIG. 31 is a plan view of the second embodiment of the photographic stitching device with a capture device attached.
Figure 32:
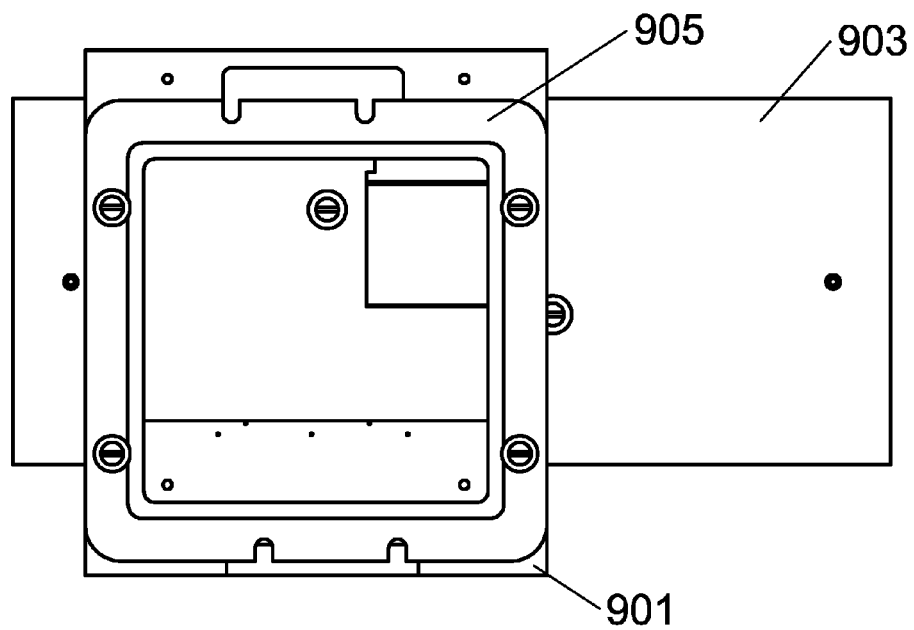
FIG. 32 is a plan view of the obverse side of a second embodiment of the photographic stitching device.

The nine way stitching device is portrayed in an assembled state in FIG. 31 where a capture device 101 can also be seen attached to the capture device mounting plate 909 and in turn to slide 903. Three groups of sequential numbers 123, 456, and 789 can be seen on the slide 903 and the slide receiver frame. To use the nine way stitching device, nine exposures are made by sequential movement of the slide in three separate positions in concert with the rotation of the entire device and of the slide independent of the frames, using either the vertical or horizontal registration pin to index three series of three exposures each. FIG. 31 shows the capture device in the horizontal position. The grouping of sequential numbers 123 on the slide 903 will be aligned with the grouping of sequential numbers 123 on the slide receiver frame 901 for the start of the first series. Once the first three exposures are taken, the entire device is rotated 180 degrees, and the next three exposures are taken using a similar sequencing procedure with the registration pin. In this series of exposures, the grouping of sequential numbers 456 on the slide 903 will be automatically aligned with the grouping of sequential numbers 456 on the slide receiver frame 901 at the start of the series. To take the last set of three exposures, the stops 1003 and 1005 are retracted, the slide 903 with the capture device 101 attached is removed from the slide receiver frame 901, rotated 180 degrees, and placed back in the slide receiver frame 901. In this last sequence of exposures, the grouping of sequential numbers 789 on the slide 903 will be aligned with the grouping of sequential numbers 789 on the slide receiver frame 901 at the start of the series and a similar sequencing procedure is followed with the registration pin. Composite images of up to nine captures may be produced by modifying the shooting sequence. Further modifications to the various embodiments of the present invention may encompass additional image captures and are considered within the spirit and broad scope of the present invention. As one can ascertain after reading this specification with the accompanying drawings, more or fewer image captures can be rendered based on simple modifications to the photographic stitching device of the present invention. It is through the novel placement of the aperture 1001 in up to 9 locations that are proximate one to the other and overlapping by a prescribed amount that nine images are created that can then be stitched using photo editing software to create a larger higher resolution composite image, a panoramic, stereoscopic, or 3-D image, or the like. To use the nine-way stitching device with the capture device mounting plate in a chosen orientation, the appropriate registration pin is used for indexing, and the slide receiver and camera mounting plates are attached to each other using the appropriate offset mounting holes FIG. 32 is a plan view of the obverse side of the nine-way photographic stitching device showing the slide receiver frame 901, the slide 903, and the camera mounting frame.

Figure 33:
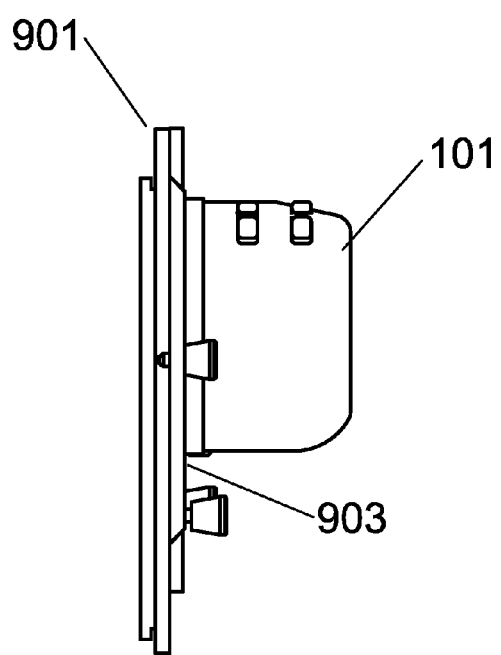
FIG. 33 is a side view of a first side of a second embodiment of the photographic stitching device with a capture device attached.
Figure 34:
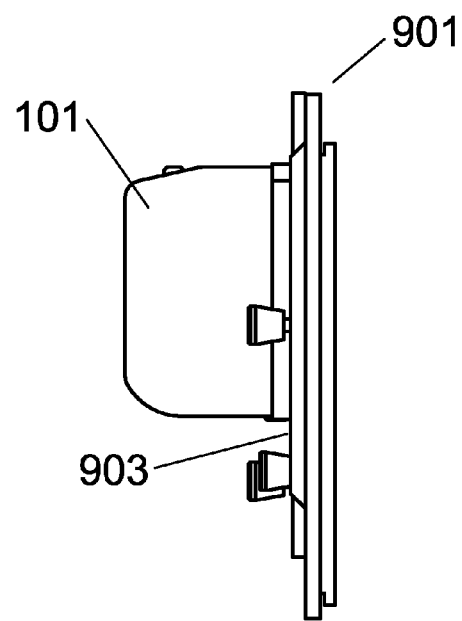
FIG. 34 is a side view of a third side of a second embodiment of the photographic stitching device with a capture device attached.
Figure 35:
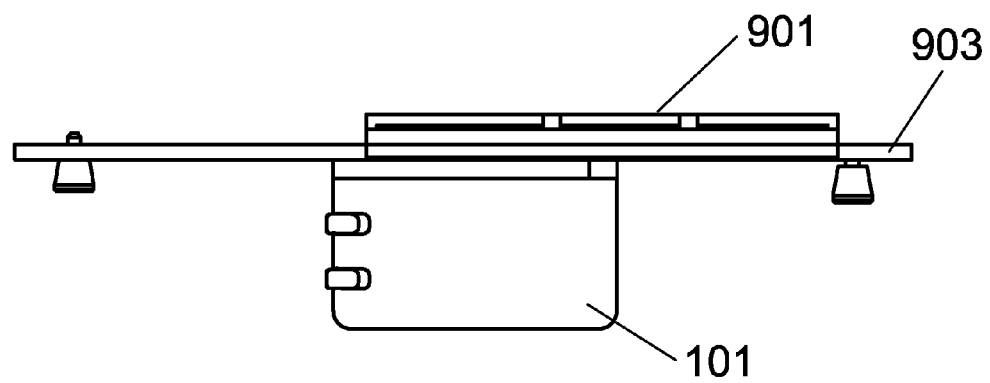
FIG. 35 is a side view of a second side of a second embodiment of the photographic stitching device; with a capture device attached.
Figure 36:
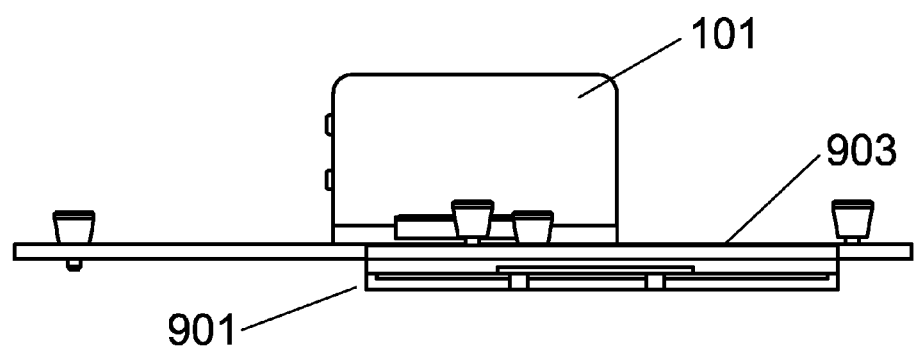
FIG. 36 is a side view of a fourth side of a second embodiment of the photographic stitching device with a capture device attached.

FIG. 33 is a side view of a first side of the nine-way photographic stitching device; FIG. 34 is a side view of a third side of the nine-way photographic stitching device; FIG. 35 is a side view of a second side of the nine-way photographic stitching device, and FIG. 36 is a side view of a fourth side of the nine-way photographic stitching device. Continuing to build on the disclosure provided thus far, further embodiments of the present invention will be described. These further embodiments exemplify the spirit and broad scope of the present invention, and provide the foundation for broad interpretation of the claims as taken in conjunction with the disclosure herein provided.

Figure 37:
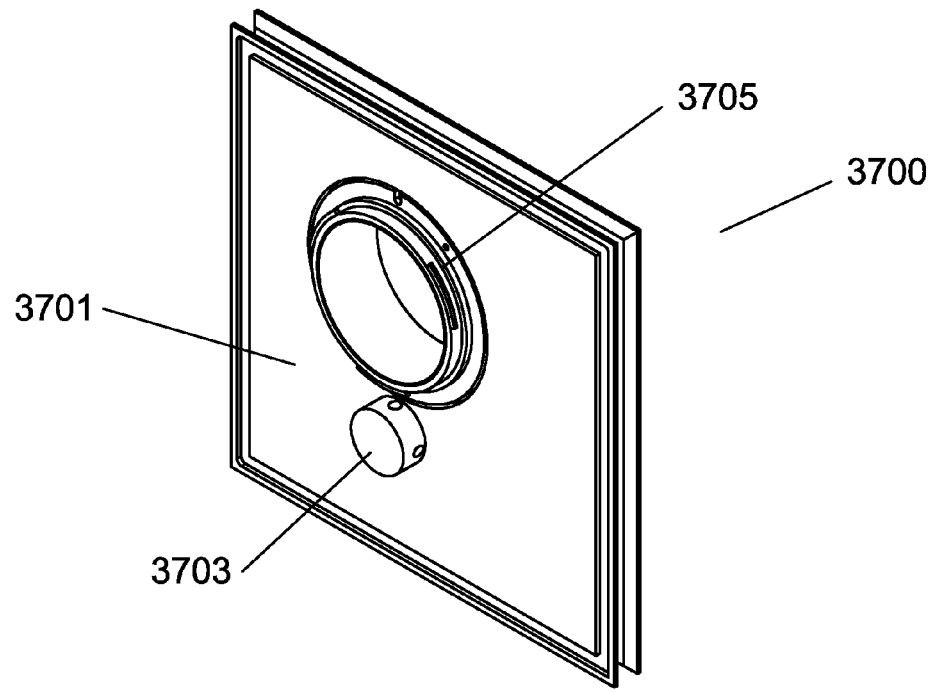
FIG. 37 is a perspective view of a third embodiment of a stitching device suitable for a digital single lens reflex camera.
Figure 38:
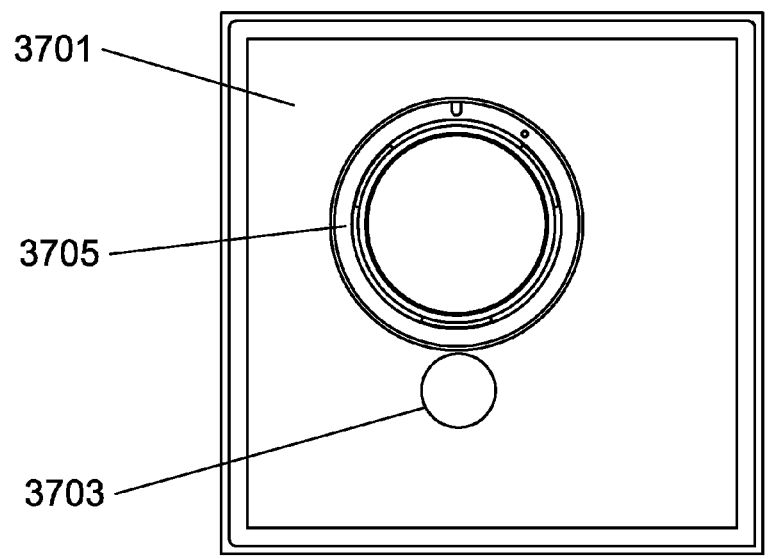
FIG. 38 is a plan view of a third embodiment of a stitching device suitable for a digital single lens reflex camera.

FIGS. 37-44 depict a four way stitching device for digital single lens reflex cameras. The basic premise of the manufacture and use of the four way stitching device for digital single lens reflex cameras being the same as that disclosed by way of the description of the four way stitching device of FIGS. 1-8. FIG. 37 is a perspective view of a stitching device suitable for a digital single lens reflex camera 3700. Similar to that depicted in FIGS. 1-8, a stitching device plate 3701 can be seen with a digital single lens reflex retention structure 3705 that provides suitable attachment of the stitching device to a digital single lens reflex camera. The retention structure 3705 may vary from one camera manufacturer to another, but is commonly made from a metal with grooves, slots, and other structures machined or otherwise formed or attached to the retention structure 3705 to provide attachment to a digital single lens reflex camera. An optional feedthrough vent 3703 can be seen in FIG. 37. This feedthrough vent provides relief of pressure between the camera and the capture device so that dust and other debris are not forced into the capture device. This feedthrough vent 3703 will be more clearly described by way of FIGS. 45A-47. The feedthrough vent 3703 may be employed on any of the embodiments of the stitching device described, depicted, or envisioned herein. FIG. 38 is a plan view of the stitching device suitable for a digital single lens reflex camera. FIG. 39 is a side view of a first side of the photographic stitching device of FIG. 37. FIG. 40 is a side view of a second side of the photographic stitching device of FIG. 37.

Figure 43:
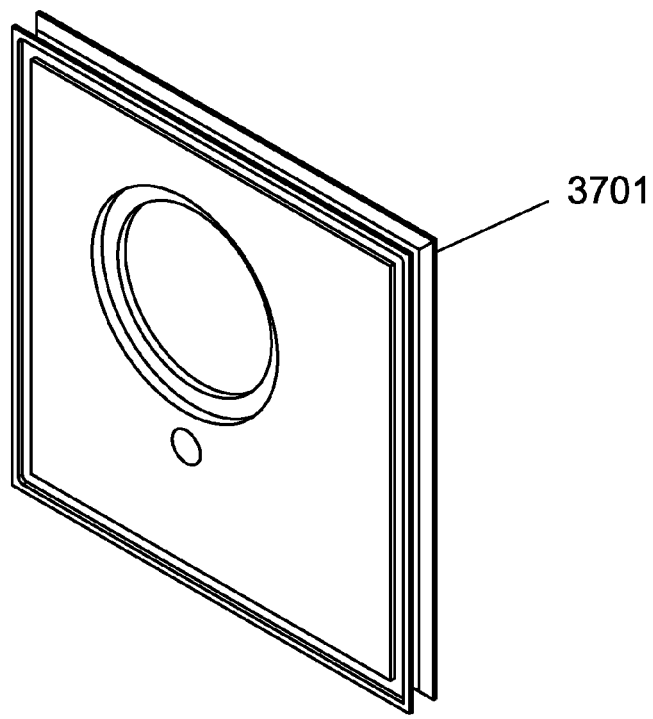
FIG. 43 is a perspective view of the unfinished plate of the photographic stitching device of FIG. 37.
Figure 44:
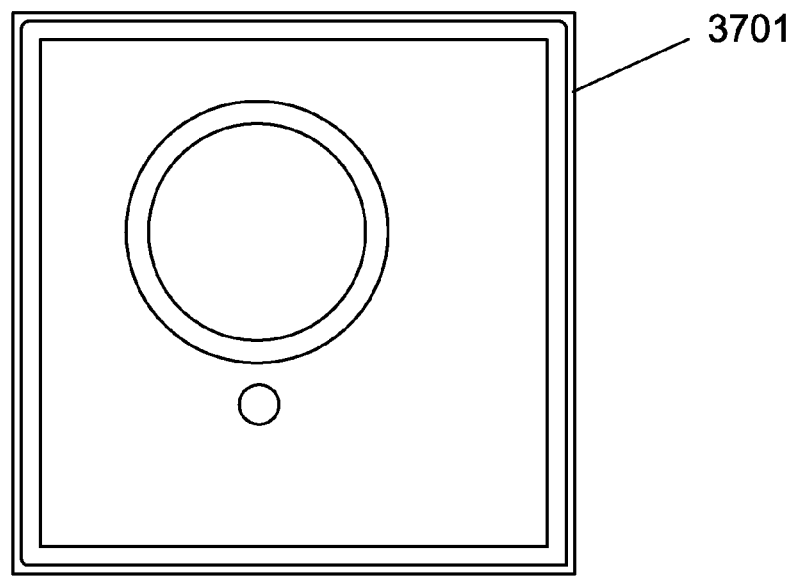
FIG. 44 is a plan view of the unfinished plate of the photographic stitching device of FIG. 37.
Figure 46A:
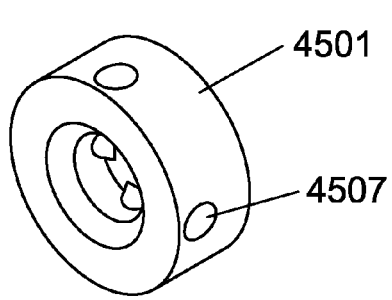
FIG. 46A is an inside perspective view of an end cap of the feedthrough vent assembly.
Figure 46B:
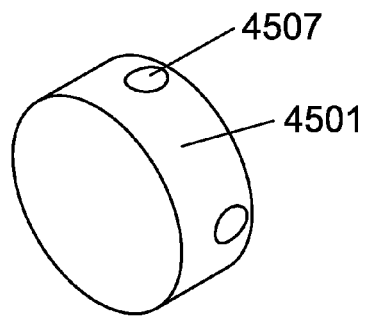
FIG. 46B is an outside perspective view of an end cap of the feedthrough vent assembly.
Figure 46C:
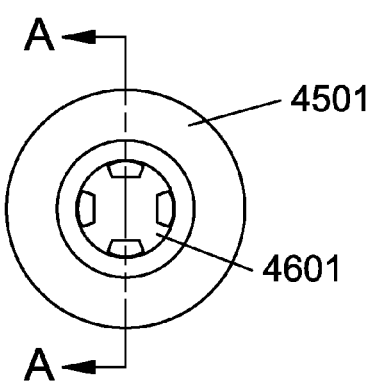
FIG. 46C is an inside plan view of an end cap of the feedthrough vent assembly.
Figure 46D:
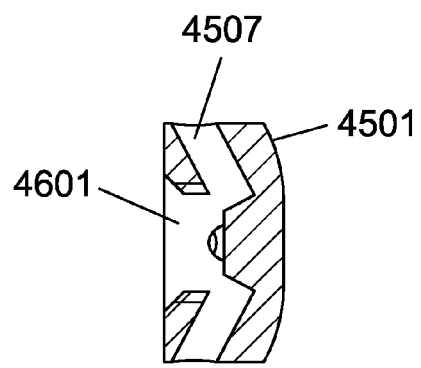
FIG. 46D is a cutaway side plan view of an end cap of the feedthrough vent assembly taken along line A-A of FIG. 46C.
Figure 46E:
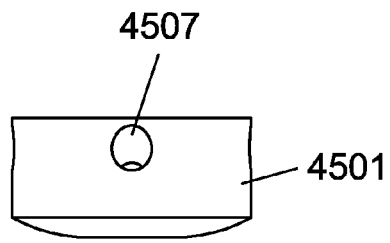
FIG. 46E is a side plan view of an end cap of the feedthrough vent assembly.
Figure 47:
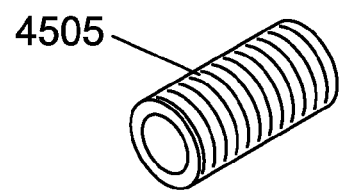
FIG. 47 is a perspective view of a feedthrough of the feedthrough vent assembly.

FIG. 41 is a side view of a third side of the photographic stitching device of FIG. 37. FIG. 42 is a side view of a fourth side of the photographic stitching device of FIG. 37. FIG. 43 is a perspective view of the unfinished plate of the photographic stitching device of FIG. 37. As can be seen, a hole for placing the feedthrough vent 3703 and a hole for placing the digital single lens reflex retention structure can be clearly seen. FIG. 44 is a plan view of the unfinished plate of the photographic stitching device of FIG. 37.

In using the photographic stitching device of the present invention, and in many other photographic and non-photographic applications alike, there is a need for a venting arrangement that allows pressures to equalize on both sides of a partition or other barrier while not allowing light to pass from one side of the partition or other barrier to the other side. Such a vent should allow pressures to equalize quickly so that dust and other debris are not forced into spaces where it can be detrimental to performance or reliability.

FIGS. 45-54 depict novel venting arrangements for a stitching device of the present invention. In FIGS. 45A-47, a feedthrough vent is depicted that comprises a first end cap 4501 having vias 4507 from a periphery of the first end cap to an interior of the first end cap 4501, a second end cap 4503 having vias 4507 from a periphery of the second end cap 4503 to an interior of the second end cap 4503, and a feedthrough 4505 having a hollow interior and connecting the first end cap 4501 to the second end cap 4503 such that the vias 4507 of the first end cap 4501 are in atmospheric communication with the vias 4507 of the second end cap while preventing light from passing there through. FIG. 45A is a plan view of the feedthrough vent assembly showing the first end cap 4501 and the second end cap 4503 mechanically coupled to the feedthrough 4505. In use, the feedthrough vent assembly would typically be placed through a hole in a partition such as the stitching device of the present invention. The feedthrough 4505 would be placed through such a hole, and each end cap then placed on each end of the feedthrough and mechanically secured. See, for example, FIGS. 37-44 for a representative installation of the feedthrough vent assembly. FIG. 45B is a perspective view of the feedthrough vent assembly. FIG. 45C is an end plan view of the feedthrough vent assembly. FIG. 45D is a rotated plan view of the feedthrough vent assembly. To fully appreciate the way in which the feedthrough vent assembly provides venting without light transmission. FIGS. 46A-46E depict various views of the first end cap 4501. The second end cap 4503 is provided in the same way as the first end cap 4501 depicted in FIGS. 46A-46E. FIG. 46A is an inside perspective view of an end cap of the feedthrough vent assembly. As seen in FIG. 46 A, the end cap 4501 has an interior with vias 4507 that pass from the outer periphery of the end cap into the interior of the first end cap. FIG. 46I is an outside perspective view of an end cap of the feedthrough vent assembly. FIG. 46C is an inside plan view of an end cap of the feedthrough vent assembly. The interior 4601 is visible along with the machined section of the vias entering from the periphery of the end cap into the interior 4601. FIG. 46I) is a cutaway side plan view of an end cap of the feedthrough vent assembly taken along line A-A of FIG. 46C. In this cutaway plan view, the vias 4507 can be seen entering from the periphery to the interior 4601. The vias 4507, in some embodiments of the present invention, enter at an angle to provide additional light blocking. FIG. 46E is a side plan view of an end cap of the feedthrough vent assembly clearly showing one of the vias 4507. The interior of the end cap 4601, as depicted in FIGS. 46A, 46C, and 46D, in some embodiments of the present invention is threaded to receive a feedthrough 4505, as seen in perspective view in FIG. 47. The final assembly being previously depicted in FIGS. 45A, 45B, and 45D.

FIGS. 48-51 depict an alternate venting approach. The vent comprises a plurality of holes placed in a first side of a stitching device plate and of a depth of about half the thickness of the stitching device plate, a plurality of holes placed in a second side of the stitching device plate and of a depth of about half the thickness of the stitching device plate, the plurality of holes placed in the first side of the stitching device plate being offset from the plurality of holes placed in the second side of the stitching device plate and joined by vias such that air may pass freely but light may not.

Figure 48:
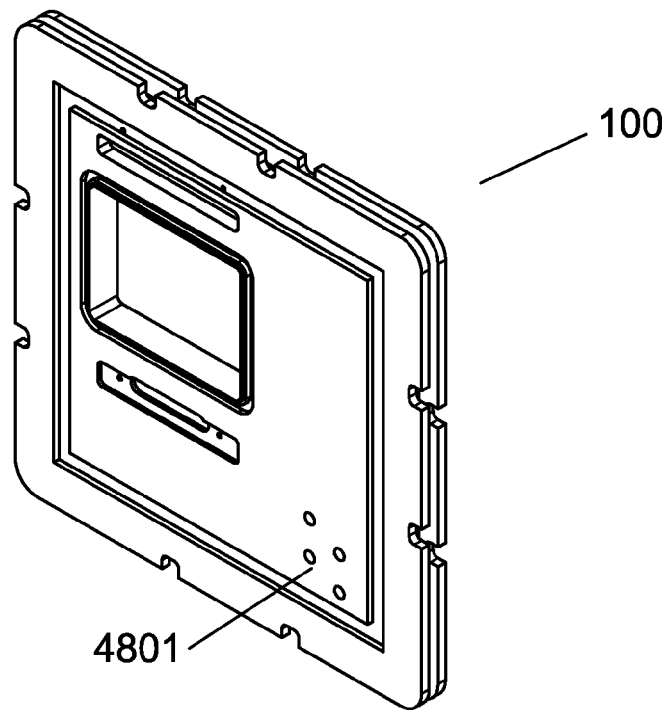
FIG. 48 is a perspective view of a photographic stitching device with an alternate venting approach.
Figure 49:
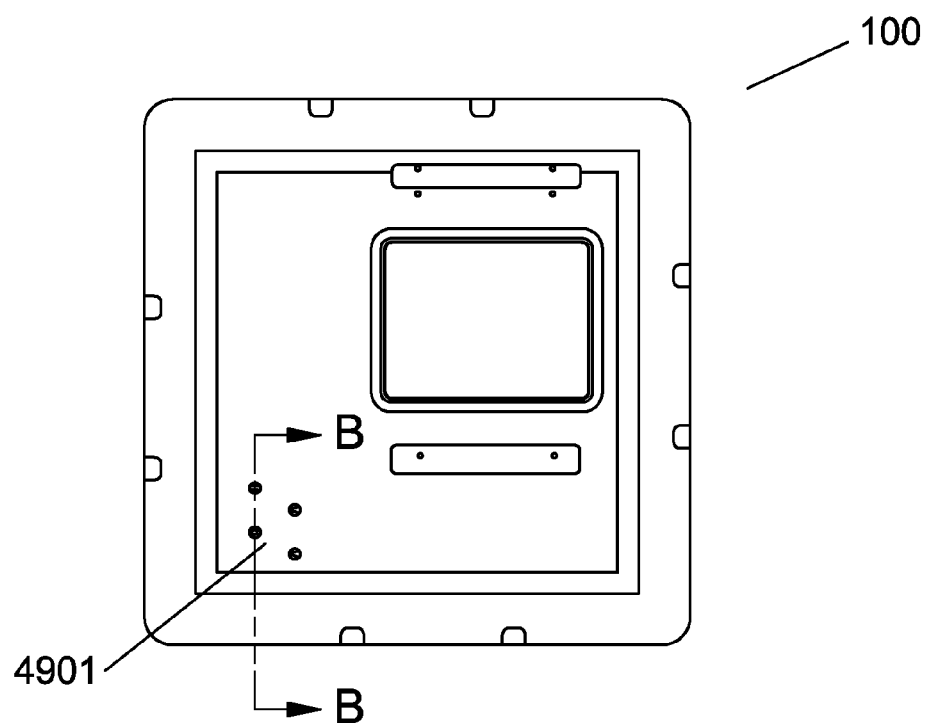
FIG. 49 is a plan view of the second side of the photographic stitching device of FIG. 48.
Figure 50:
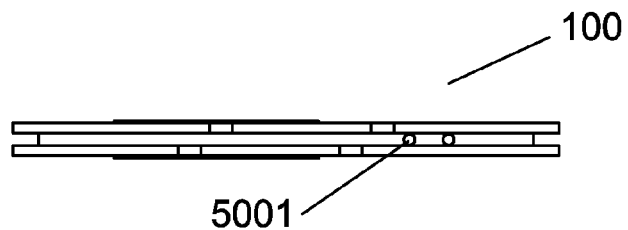
FIG. 50 is a side view of the photographic stitching device of FIG. 48.
Figure 51:
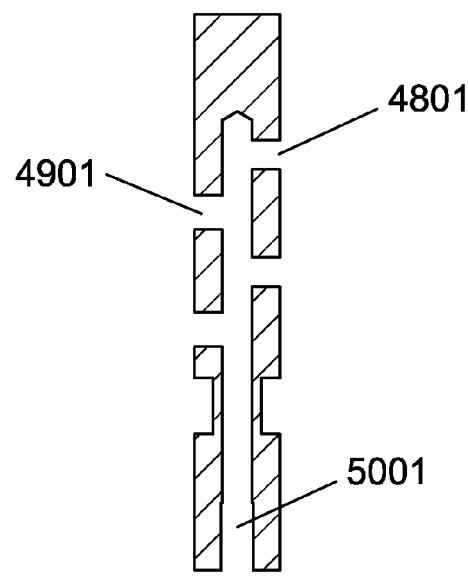
FIG. 51 is a cutaway side plan view of the photographic stitching device of FIG. 48 taken along line B-B of FIG. 49.

FIG. 48 depicts a perspective view of a photographic stitching device 100 with such an alternate venting approach. The first side vent holes 4801 can be clearly seen. The figures depict four vent holes on each side; more or fewer vent holes may be employed. FIG. 49 is a plan view of the second side of the photographic stitching device of FIG. 48. The second side vent holes 4901 can be clearly seen. FIG. 50 is a side view of the photographic stitching device of FIG. 48. The vent hole connector vias 5001 can be seen entering from the side. To fully understand the alternate venting approach, FIG. 51 is a cutaway side plan view of the photographic stitching device of FIG. 48 taken along line B-B of FIG. 49. As can be seen, the first side vent holes 4801 and the second side vent holes 4901 are offset from each other and connected by vent hole connector vias 5001. Such an arrangement allows air or other gases, or perhaps fluids such as water, to pass, without allowing light to pass.

Figure 52:
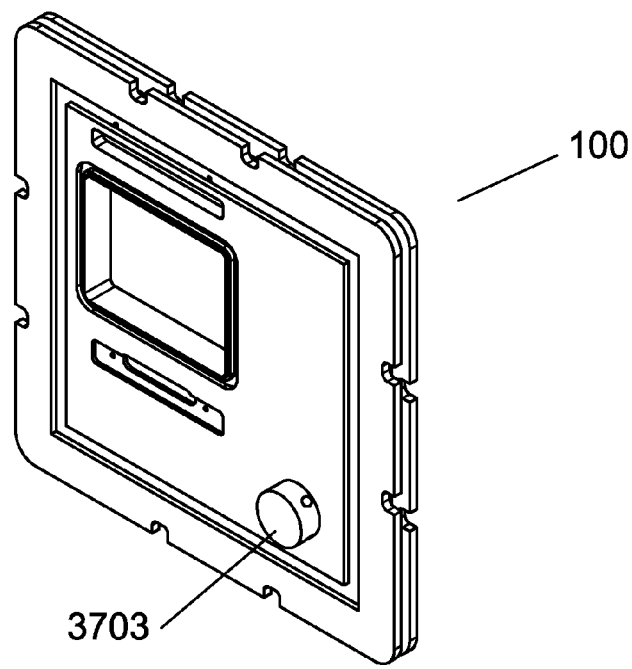
FIG. 52 is a perspective view of a photographic stitching device with a feedthrough vent assembly.
Figure 53:
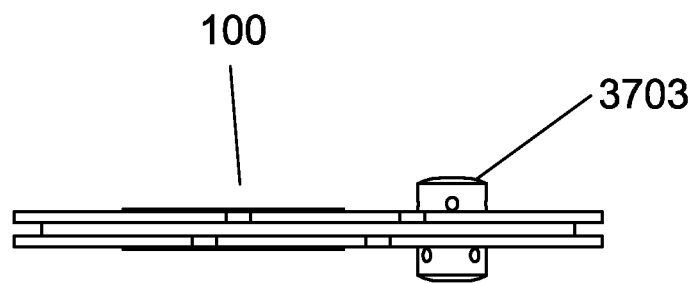
FIG. 53 is a side view of a photographic stitching device with a feedthrough vent assembly.
Figure 54:
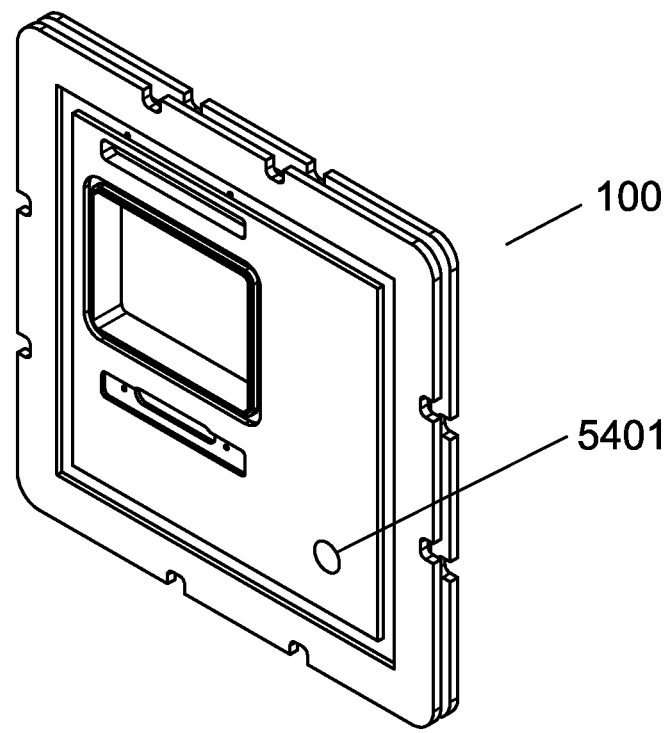
FIG. 54 is a perspective view of the photographic stitching device of FIG. 52 with the feedthrough vent assembly removed.

FIG. 52 is a perspective view of a photographic stitching device 100 with a feedthrough vent assembly 3703 in use. FIG. 53 is a side view of a photographic stitching device 100 with a feedthrough vent assembly 3703. FIG. 54 is a perspective view of the photographic stitching device of FIG. 52 with the feedthrough vent assembly removed. The feedthrough vent assembly is to be installed in the feedthrough vent hole 5401.

Figure 55:
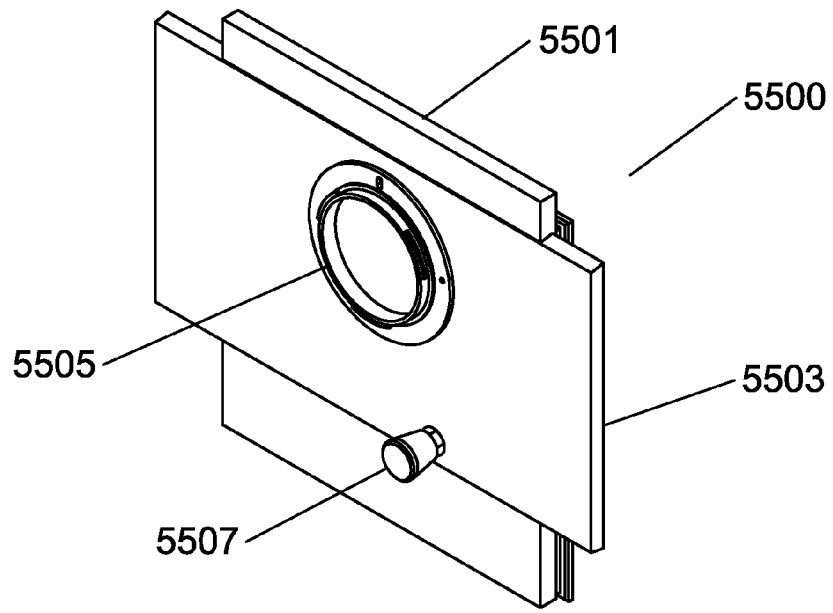
FIG. 55 is a perspective view of a fourth embodiment of a stitching device suitable for a digital single lens reflex camera.
Figure 56:
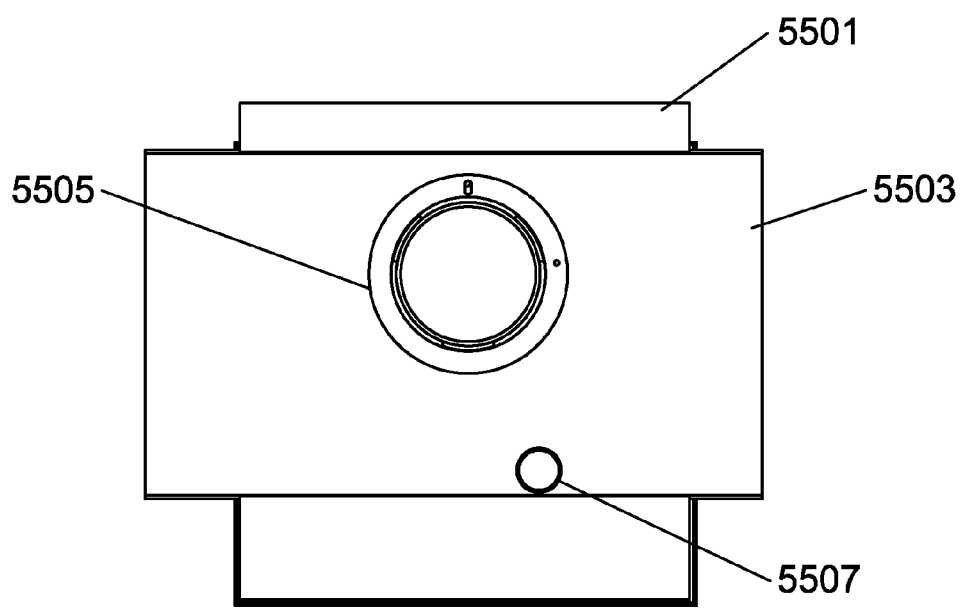
FIG. 56 is a plan view of a fourth embodiment of a photographic stitching device suitable for a digital single lens reflex camera.
Figure 57:
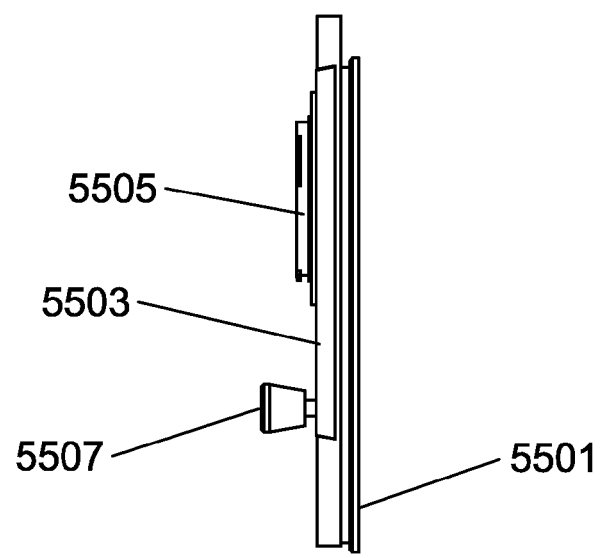
FIG. 57 is a side view of a fourth embodiment of a photographic stitching device suitable for a digital single lens reflex camera.

Other embodiments of the present invention can also be envisioned after reviewing the disclosure heretofore provided. For example, FIGS. 55-62 depict a twelve way stitching device for Digital Single Lens Reflex cameras. FIG. 55 is a perspective view of a fourth embodiment of a stitching device 5500 suitable for a digital single lens reflex camera. Manufacture and use is similar to the previous embodiments of the present invention heretofore described. A slide receiver frame 5501 can be seen with a slide 5503 that is slidingly engaged in the slide receiver frame. A digital single lens reflex retention structure 5505 can be seen attached to the slide 5503 with an opening therethrough. A registration pin 5507 can also be seen on the slide 5503 for engaging with registration pin holes (not seen in FIG. 55, see FIG. 58) on the slide receiver frame 5501. FIG. 56 is a plan view of the stitching device of FIG. 55, and FIG. 57 is a side view of the stitching device of FIG. 55.

Figure 58:
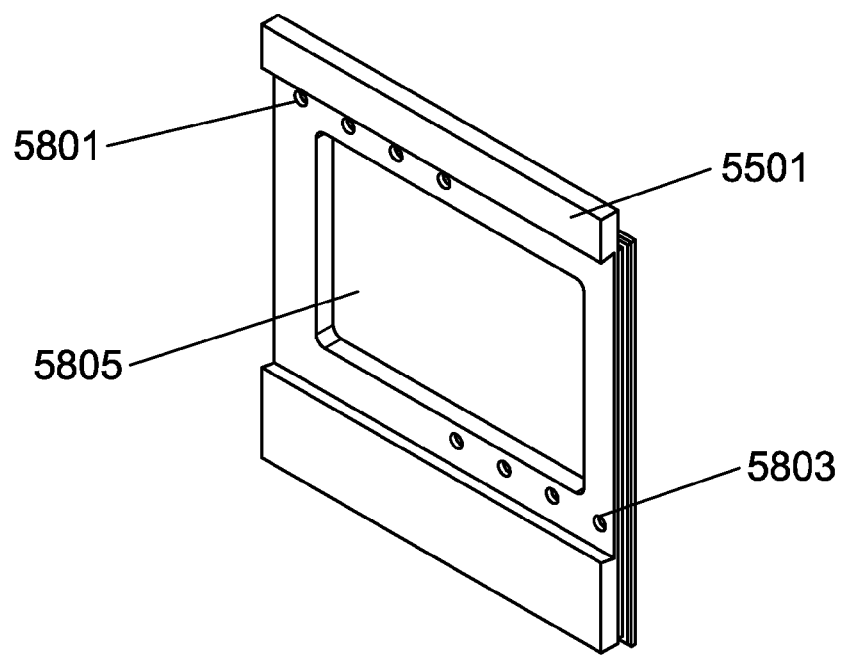
FIG. 58 is a perspective view of a slide receiver frame of the photographic stitching device of FIG. 56.
Figure 59:
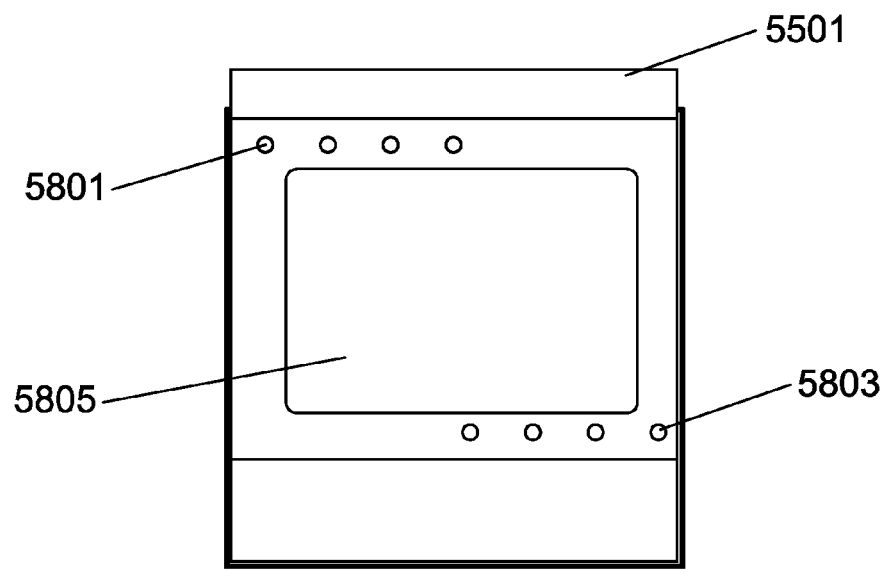
FIG. 59 is a plan view of the slide receiver frame of the photographic stitching device of FIG. 56.
Figure 60:
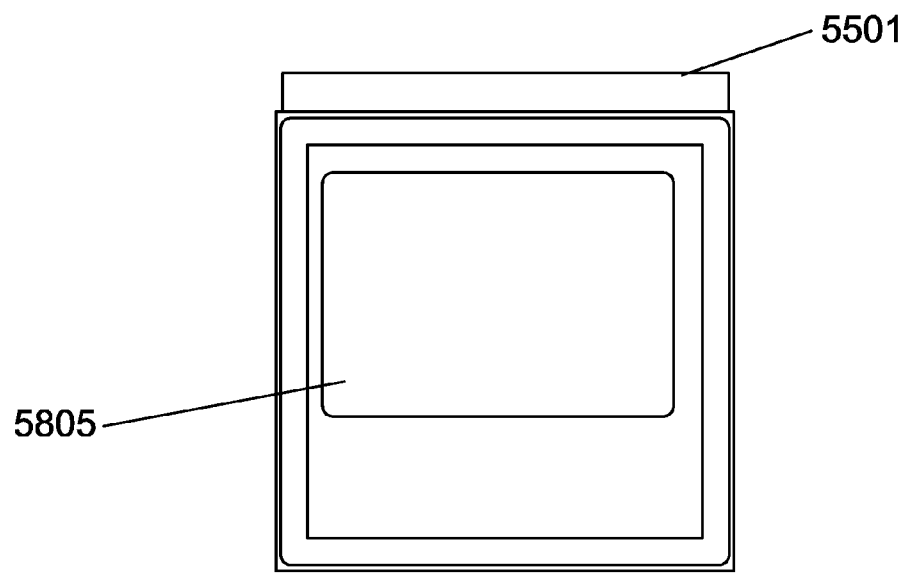
FIG. 60 is a back plan view of the slide receiver frame of the photographic stitching device of FIG. 56.
Figure 61:
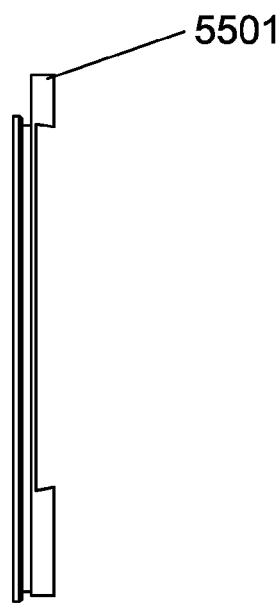
FIG. 61 is a side view of the slide receiver frame of FIG. 58.
Figure 62:
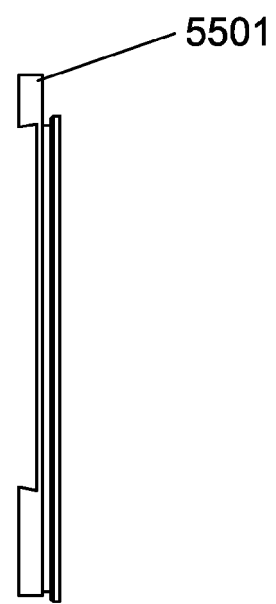
FIG. 62 is a opposite side view of the slide receiver frame of FIG. 58.

FIG. 58 is a perspective view of a slide receiver frame of the photographic stitching device of FIG. 56. The slide receiver frame 5501 has an opening 5805 and registration pin holes 5801 as well as inverse registration pin holes 5803 for engagement of the registration pin 5507 as previously depicted in FIG. 55. FIG. 59 is a plan view of the slide receiver frame of the photographic stitching device of FIG. 56. FIG. 60 is a back plan view of the slide receiver frame of the photographic stitching device of FIG. 56. FIG. 61 is a side view of the slide receiver frame of FIG. 58. FIG. 62 is a opposite side view of the slide receiver frame of FIG. 58.

Figure 63:
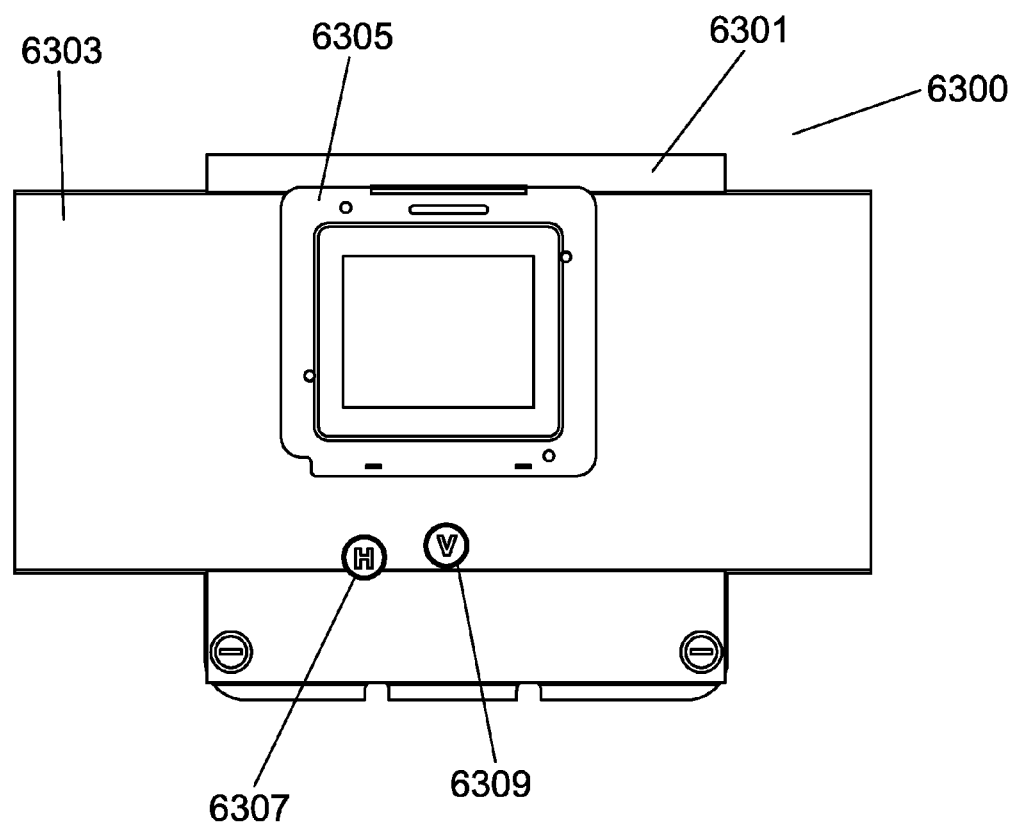
FIG. 63 is a plan view of a fifth embodiment of a photographic stitching device.
Figure 64:
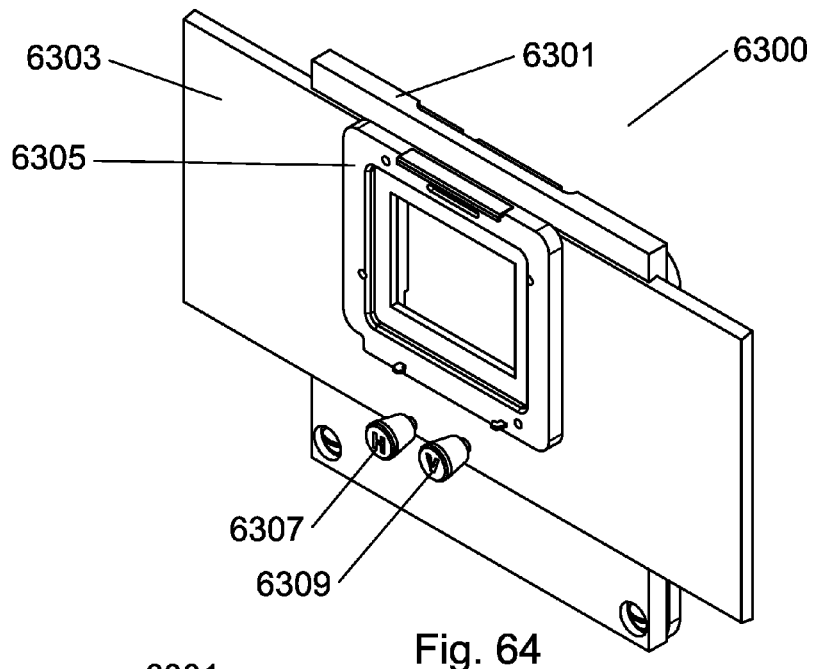
FIG. 64 is a perspective view of a fifth embodiment of a photographic stitching device.
Figure 65:
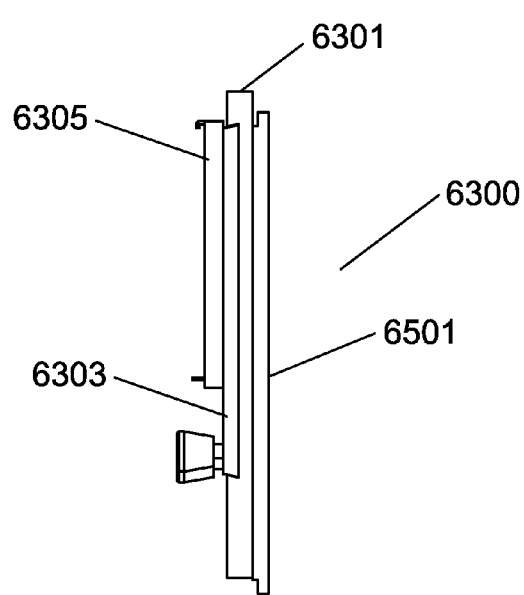
FIG. 65 is a side view of a fifth embodiment of a photographic stitching device.
Figure 65A:
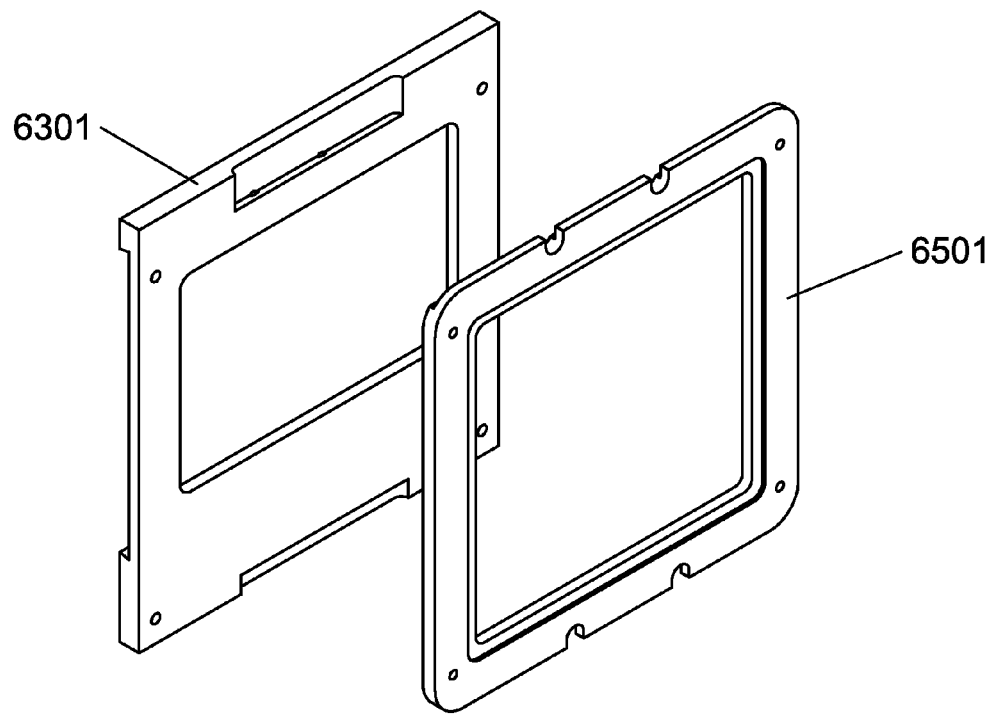
FIG. 65a is an exploded perspective view of the slide receiver frame and camera mounting frame of the photographic stitching device of FIG. 63.
Figure 66:
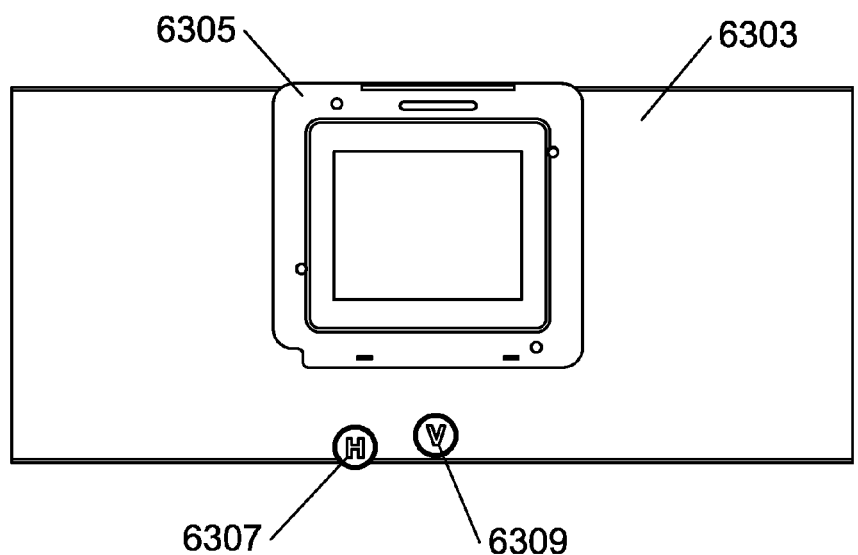
FIG. 66 is a plan view of a slide of the photographic stitching device of FIG. 63.
Figure 67:
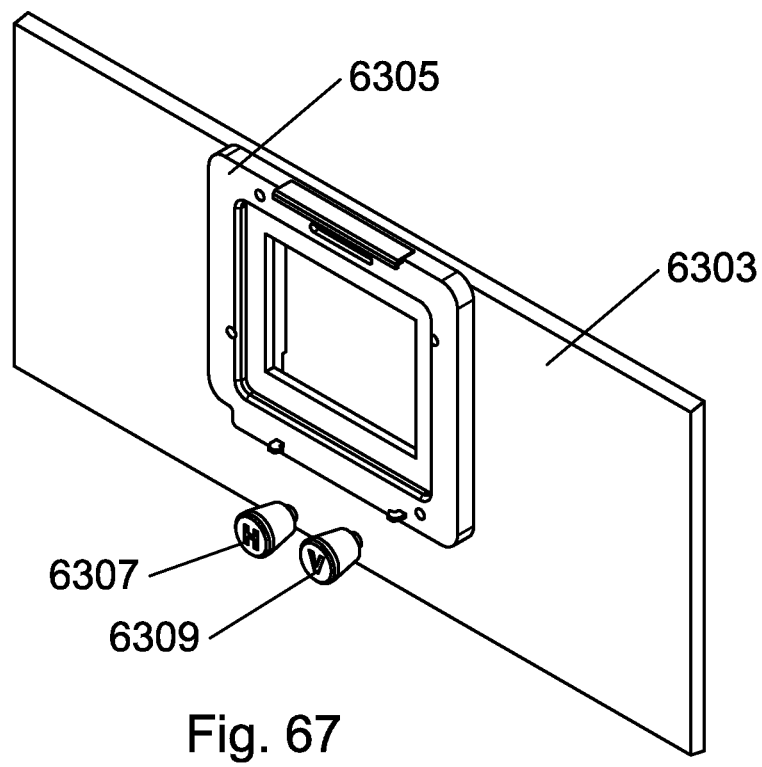
FIG. 67 is a perspective view of a slide of the photographic stitching device of FIG. 63.
Figure 68:
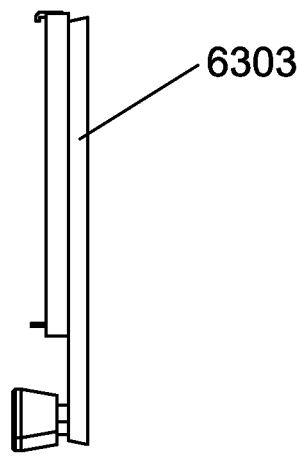
FIG. 68 is a side view of a slide of the photographic stitching device of FIG. 63.
Figure 69:
FIG. 69 is a side view of a slide receiver frame of the photographic stitching device of FIG. 63.
Figure 70:
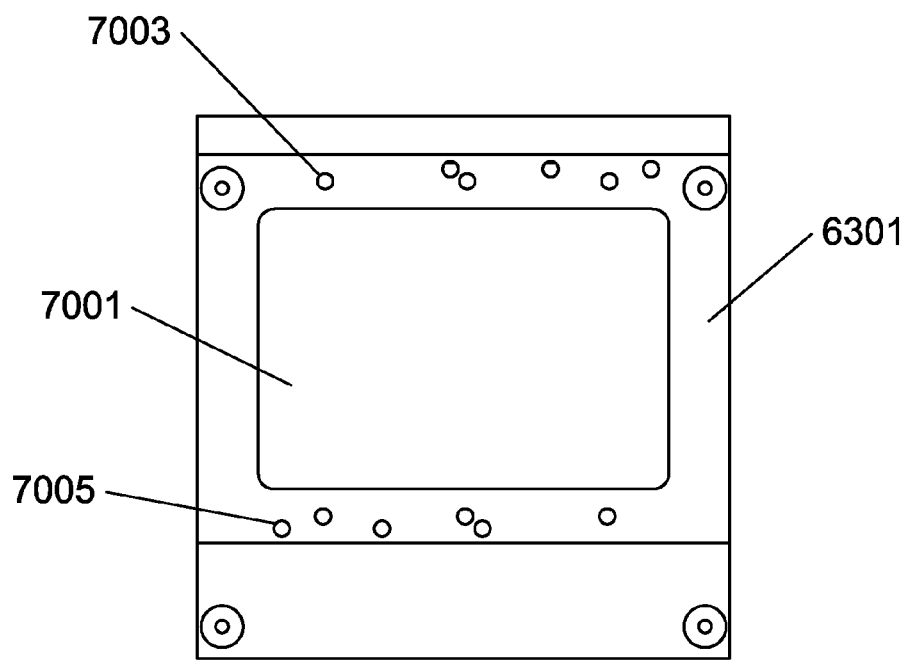
FIG. 70 is a plan view of the slide receiver frame of the photographic stitching device of FIG. 63.
Figure 71:
FIG. 71 is an opposite side view of a slide receiver frame of the photographic stitching device of FIG. 63.
Figure 72:
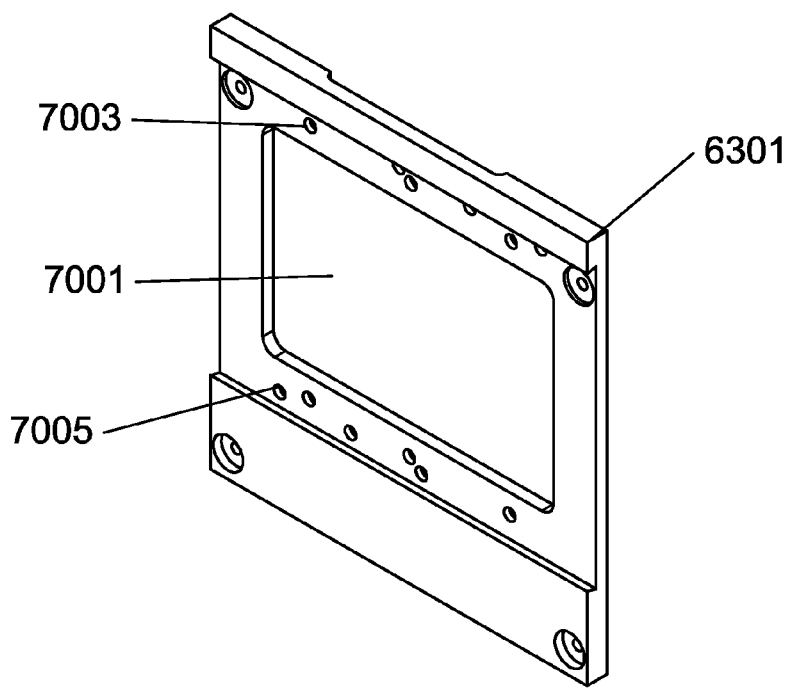
FIG. 72 is a perspective view of the slide receiver frame of the photographic stitching device of FIG. 63.

Similar to the embodiment of the photographic stitching device of FIG. 9, FIGS. 63-75 depict an alternate embodiment of the nine way stitching device previously depicted in FIGS. 9-36. A slide receiver frame 6301 is shown with a slide 6303 slidingly engaged there within. A capture device mounting plate 6305 is also seen attached to the slide 6303 with an opening through the slide and within the opening of the capture device mounting plate 6305. A horizontal registration pin 6307 and a vertical registration pin 6309 can also be seen attached to the slide 6303. FIG. 63 is a plan view of this alternate embodiment of the photographic stitching device. FIG. 64 is a perspective view of this alternate embodiment of the photographic stitching device. FIG. 65 is a side view of this alternate embodiment of the photographic stitching device. FIG. 65a is an exploded perspective view of the slide receiver frame and camera mounting frame of the photographic stitching device of FIG. 63. FIG. 66 is a plan view of the slide of the photographic stitching device of FIG. 63. FIG. 67 is a perspective view of the slide of the photographic stitching device of FIG. 63. FIG. 68 is a side view of the slide of the photographic stitching device of FIG. 63. FIG. 69 is a side view of the slide receiver frame of the photographic stitching device of FIG. 63. FIG. 70 is a plan view of the slide receiver frame of the photographic stitching device of FIG. 63. The slide receiver frame 6301 has an opening 7001, as well as registration pin holes 7003 and inverse registration pin holes 7005 for engagement of the registration pins (see FIG. 63 for depiction of the horizontal registration pins and the vertical registration pins). FIG. 71 is an opposite side view of a slide receiver frame of the photographic stitching device of FIG. 63. FIG. 72 is a perspective view of the slide receiver frame of the photographic stitching device of FIG. 63.

Figure 73:
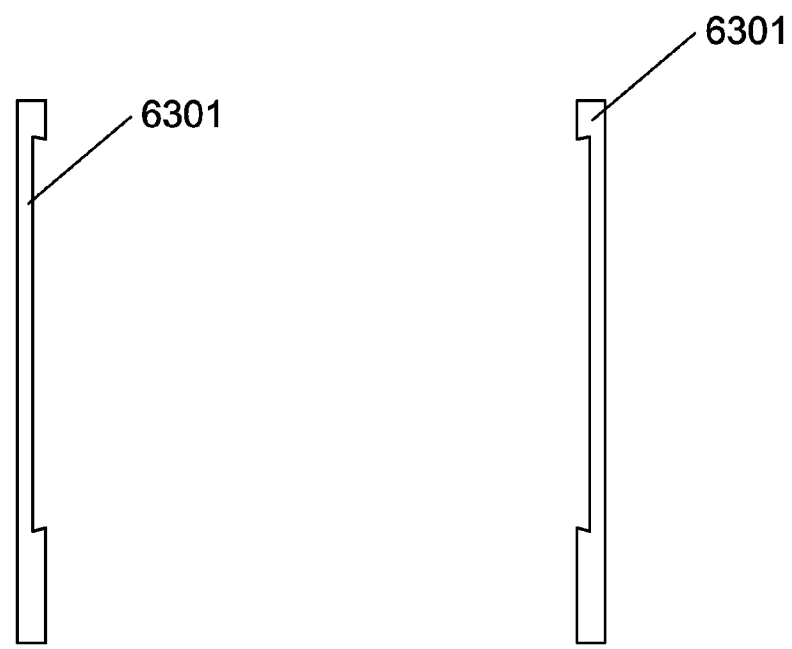
FIG. 73 is an end side view of a slide receiver frame of the photographic stitching device of FIG. 63.
Figure 74:
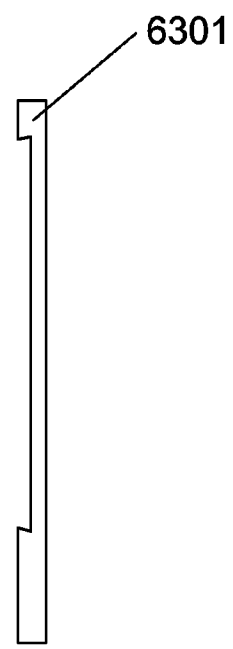
FIG. 74 is an opposite end side view of a slide receiver frame of the photographic stitching device of FIG. 63.
Figure 75:
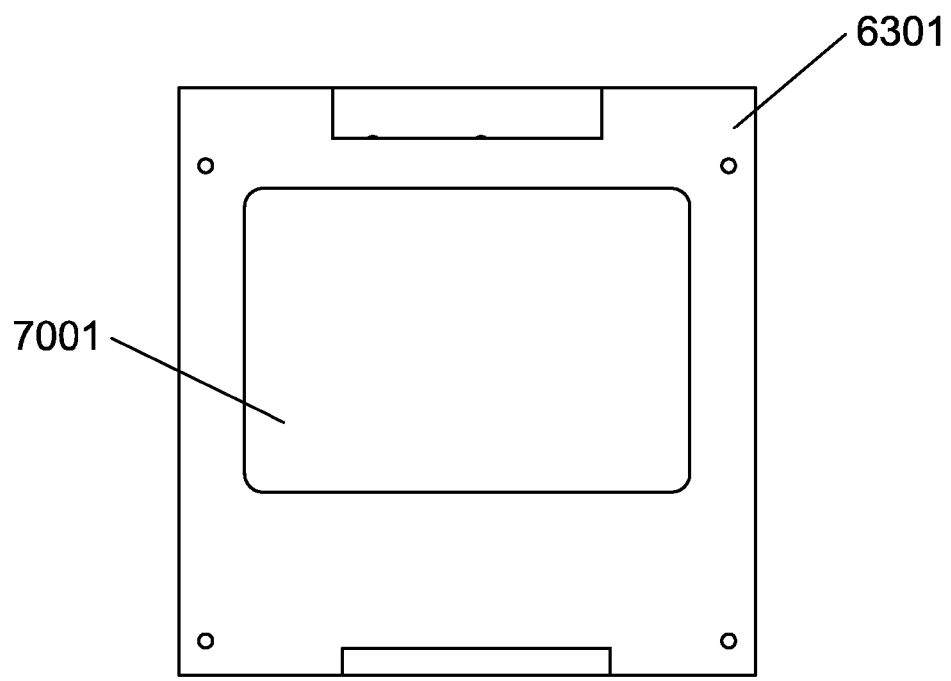
FIG. 75 is a back plan view of the slide receiver frame of the photographic stitching device of FIG. 63.

FIG. 73 is an end side view of a slide receiver frame of the photographic stitching device of FIG. 63. FIG. 74 is an opposite end side view of a slide receiver frame of the photographic stitching device of FIG. 63. FIG. 75 is a back plan view of the slide receiver frame of the photographic stitching device of FIG. 63.

Figure 76:
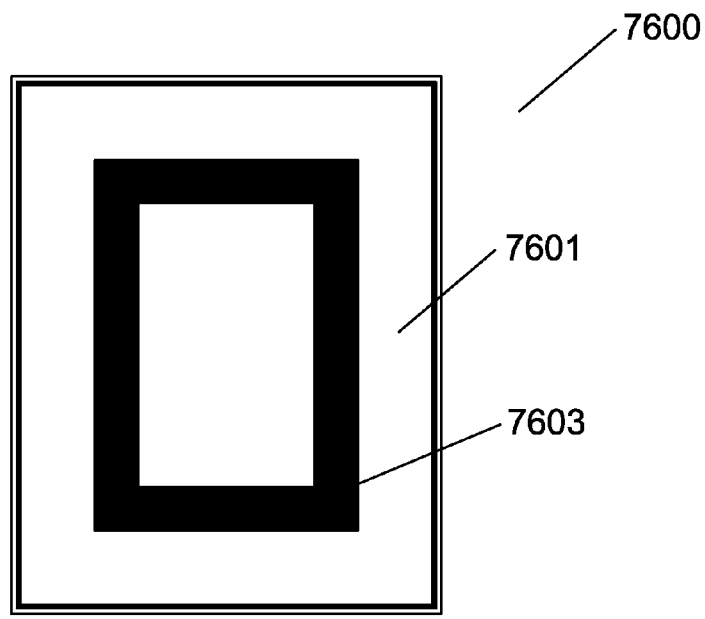
FIG. 76 is a plan view of a mask for use with the photographic stitching device.
Figures 77, 78:
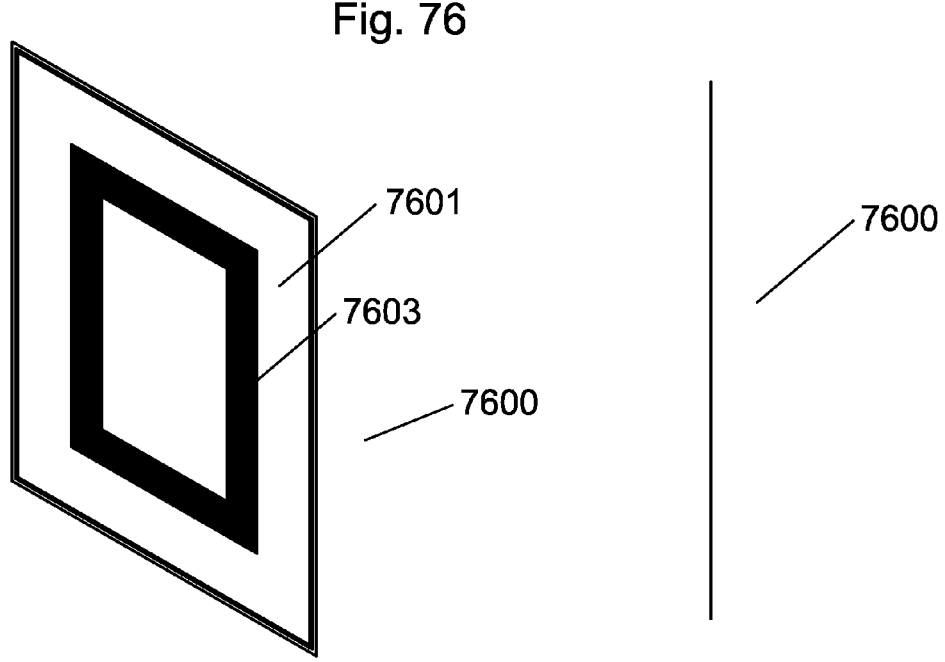
FIG. 77 is a perspective view of the mask for use with the photographic stitching device.
FIG. 78 is a side view of the mask for use with the photographic stitching device.

In many applications, the use of the photographic stitching device of the present invention requires a mask to provide proper composition and layout of each of the various images that are later digitally stitched together. An example of such a mask that may be placed in the optical path between lens and ground glass is seen in FIGS. 76-78. FIG. 76 is a plan view of an exemplary mask for use with the photographic stitching device. The mask 7600 has a substrate 7601, such as an optically transparent film. The mask 7600 also has a masked area 7603 that serves as a light barrier such as a black printed area. FIG. 77 is a perspective view of the mask for use with the photographic stitching device, and FIG. 78 is a side view of the mask for use with the photographic stitching device.

It is, therefore, apparent that there has been provided, in accordance with various objects of the present invention, a photographic stitching device. While the various objects of this invention have been described in conjunction with preferred embodiments, it is evident that many alternatives, modifications, and variations will be apparent to those skilled in the art. Accordingly, it is intended to embrace all such alternatives, modifications and variations that fall within the spirit and broad scope of this specification, claims and drawings.

What is claimed is:
1. A photographic stitching device comprising:
A stitching device plate of a generally planar structure having a first side and an obverse side;
an aperture through the stitching device plate;

the aperture being offset from the center of the stitching device plate;
a capture device mounting structure on the first side of the stitching device plate for receiving a capture device;
a camera frame mounting structure on the first side of the stitching device plate for receiving a camera frame;
a light trap surrounding the aperture for optically sealing a capture device to the aperture;
a capture device mounting structure on the obverse side of the stitching device plate for receiving a capture device; and
a camera frame mounting structure on the obverse side of the stitching device plate for receiving a camera frame.

2. The photographic stitching device of claim 1, further comprising a light trap surrounding the stitching device plate for optically sealing a camera to the stitching device plate.

3. The photographic stitching device of claim 1, further comprising a digital camera body retention structure affixed to said stitching device plate.

4. The photographic stitching device of claim 1, further comprising a large format camera frame.

5. The photographic stitching device of claim 1, further comprising a focusing spacer.

6. The photographic stitching device of claim 1, further comprising an image mask.

7. The photographic stitching device of claim 1, wherein the light trap surrounding the aperture comprises a channel in the stitching device plate.

8. The photographic stitching device of claim 1, wherein the light trap surrounding the stitching device plate comprises a channel in the stitching device plate.

9. The photographic stitching device of claim 1, further comprising a feedthrough vent placed through the stitching device plate wherein the feedthrough vent comprises a first end cap having vias from a periphery of the first end cap to an interior of the first end cap, a second end cap having vias from a periphery of the second end cap to an interior of the second end cap, and a feedthrough having a hollow interior and connecting the first end cap to the second end cap.

10. The photographic stitching device of claim 1, further comprising a vent, the vent comprising a plurality of holes placed in a first side of the stitching device plate and of a depth of about half the thickness of the stitching device plate, a plurality of holes placed in a second side of the stitching device plate and of a depth of about half the thickness of the stitching device plate, the plurality of holes placed in the first side of the stitching device plate being offset from the plurality of holes placed in the second side of the stitching device plate and joined by vias such that air may pass freely but light may not.

11. The photographic stitching device of claim 1, further comprising a capture device.

* * * * *